(12) United States Patent
Hurlbut

(10) Patent No.: US 9,767,103 B2
(45) Date of Patent: Sep. 19, 2017

(54) METHOD AND SYSTEM FOR FORMATTING DATA FROM ONE SOFTWARE APPLICATION SOURCE INTO A FORMAT COMPATIBLE FOR IMPORTING INTO ANOTHER SOFTWARE APPLICATION

(71) Applicant: Craig Hurlbut, Webster, NY (US)

(72) Inventor: Craig Hurlbut, Webster, NY (US)

( * ) Notice: Subject to any disclaimer, the term of this patent is extended or adjusted under 35 U.S.C. 154(b) by 333 days.

(21) Appl. No.: 14/530,920

(22) Filed: Nov. 3, 2014

(65) Prior Publication Data

US 2015/0128018 A1    May 7, 2015

Related U.S. Application Data

(60) Provisional application No. 61/899,250, filed on Nov. 3, 2013, provisional application No. 62/014,481, filed on Jun. 19, 2014.

(51) Int. Cl.

| *G06F 17/00* | (2006.01) |
| *G06F 17/30* | (2006.01) |
| *G06Q 40/00* | (2012.01) |
| *G06Q 40/02* | (2012.01) |
| *G06Q 10/10* | (2012.01) |
| *G06F 17/22* | (2006.01) |

(52) U.S. Cl.
CPC .... *G06F 17/30076* (2013.01); *G06F 17/2252* (2013.01); *G06Q 10/10* (2013.01); *G06Q 40/02* (2013.01); *G06Q 40/12* (2013.12)

(58) Field of Classification Search
None
See application file for complete search history.

(56) References Cited

U.S. PATENT DOCUMENTS

| 5,893,123 | A | 4/1999 | Tuinenga |
| 6,604,110 | B1 * | 8/2003 | Savage ............ G06F 17/30563 |
| | | | 707/602 |
| 7,249,316 | B2 | 7/2007 | Collie et al. |
| 7,433,878 | B2 | 10/2008 | Mika |
| 7,624,372 | B1 | 11/2009 | Stewart |
| 7,640,493 | B2 | 12/2009 | Collie et al. |
| 7,703,007 | B2 | 4/2010 | Collie et al. |
| 7,770,110 | B1 | 8/2010 | Mansell et al. |
| 7,805,127 | B2 | 9/2010 | Andreasen et al. |
| 7,954,046 | B2 | 5/2011 | Collie et al. |
| 7,987,121 | B2 | 7/2011 | Conrad et al. |
| 8,006,174 | B2 | 8/2011 | Aureglia et al. |
| 8,200,539 | B2 * | 6/2012 | Leon ................ G06F 17/30569 |
| | | | 345/419 |
| 8,239,751 | B1 | 8/2012 | Rochelle et al. |
| 8,271,519 | B2 | 9/2012 | Young |

(Continued)

*Primary Examiner* — Howard Cortes
(74) *Attorney, Agent, or Firm* — Michael J. Nickerson; Basch & Nickerson LLP

(57) ABSTRACT

A method and system electronically pull, using an extension of a launched program, accounting data from a launched accounting software application. The pulled data is converted, by the extension, into a format compatible with a second accounting software application. The converted data is written into the launched application associated with the extension. The written data is converted, by another extension, into a format compatible for importing into another accounting software application. The format compatible data is pushed into the second accounting software application by the extension.

20 Claims, 7 Drawing Sheets

(56) References Cited

U.S. PATENT DOCUMENTS

| | | |
|---|---|---|
| 8,370,464 B1 | 2/2013 | Chitilian et al. |
| 2004/0260728 A1 | 12/2004 | Mika |
| 2006/0005126 A1* | 1/2006 | Shapiro ............... G06F 17/2247 |
| | | 715/248 |
| 2006/0026137 A1 | 2/2006 | Sattler et al. |
| 2006/0190814 A1* | 8/2006 | Collie ................. G06F 17/2229 |
| | | 715/212 |
| 2008/0306986 A1* | 12/2008 | Doyle, Sr. .............. G06Q 10/10 |
| 2009/0158251 A1* | 6/2009 | Angrish ............ G06F 17/30914 |
| | | 717/115 |
| 2009/0172553 A1* | 7/2009 | Sikka ..................... G06Q 10/10 |
| | | 715/733 |
| 2012/0110001 A1 | 5/2012 | Young |
| 2012/0144284 A1 | 6/2012 | Le Brazidec et al. |
| 2012/0236377 A1* | 9/2012 | Kaigawa ............ G06K 9/00442 |
| | | 358/505 |
| 2013/0061123 A1 | 3/2013 | Rochelle et al. |
| 2013/0151938 A1 | 6/2013 | Waldman et al. |

\* cited by examiner

| | A | B | C | D | E | F | G | H | I | J | K |
|---|---|---|---|---|---|---|---|---|---|---|---|
| 1 | Company Name | Email | First Name | Last Name | Street Address | Mailing Address | City | State | Country | Postal Code | Phone |
| 2 | ABC Corp | abc@abc.com | John | Doe | 12 Street | PO Box 3 | XYZ | KS | US | 1111 | 111-222-3333 |
| 3 | TUV Inc | gm@tuv.com | Jane | Hasse | 23 Road | 23 Road | Jol | LO | US | 55555 | 777-999-8888 |
| 4 | IOU LLC | mario@iou.com | Mario | Goodguy | 67 Drive | 67 Drive | Seemet | YO | US | 99999 | 555-444-6666 |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |

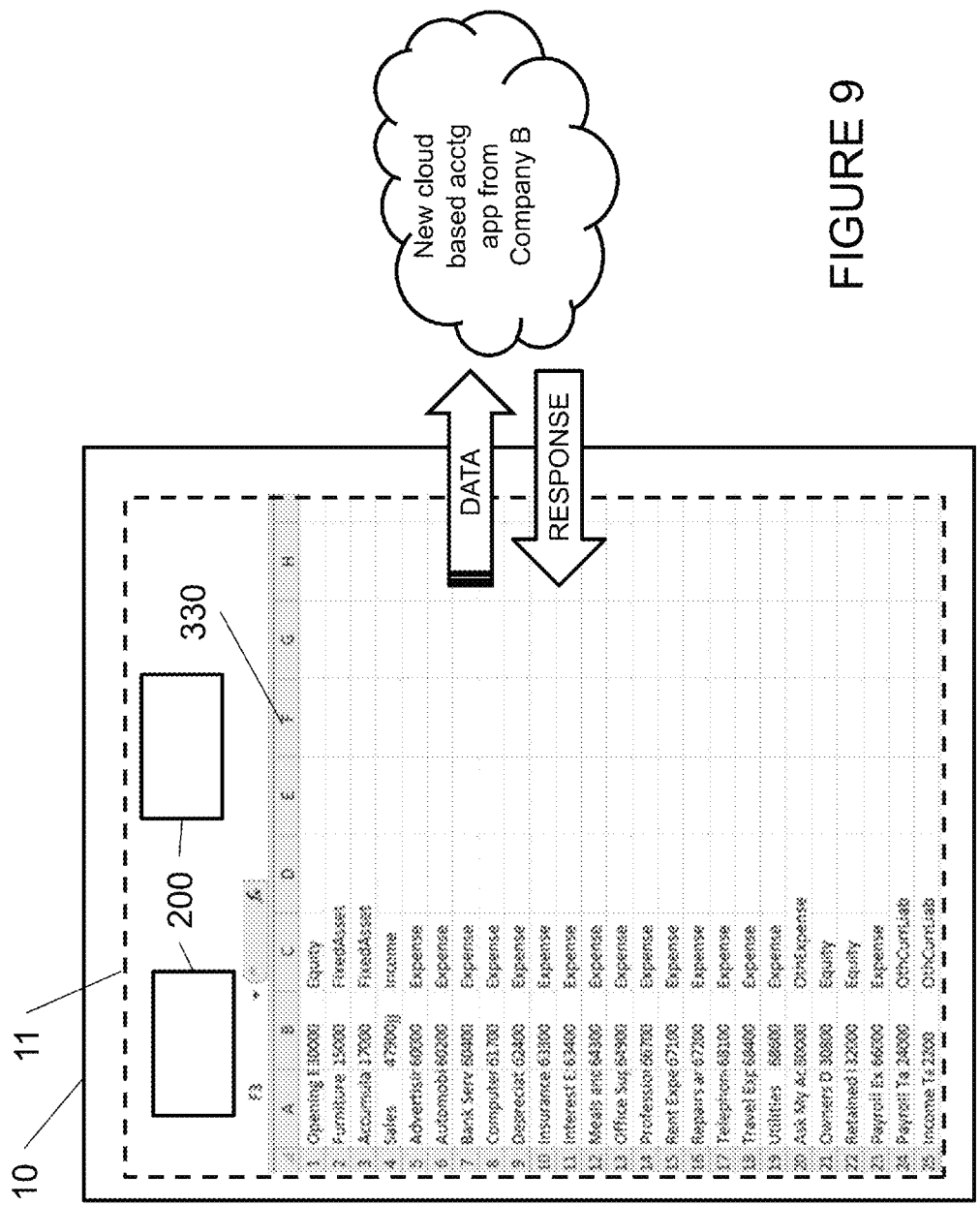

METHOD AND SYSTEM FOR FORMATTING DATA FROM ONE SOFTWARE APPLICATION SOURCE INTO A FORMAT COMPATIBLE FOR IMPORTING INTO ANOTHER SOFTWARE APPLICATION

PRIORITY INFORMATION

This application claims priority from U.S. Provisional Patent Application, Ser. No. 61/899,250, filed on Nov. 3, 2013. The entire content of U.S. Provisional Patent Application, Ser. No. 61/899,250, filed on Nov. 3, 2013, is hereby incorporated by reference.

This application claims priority from U.S. Provisional Patent Application, Ser. No. 62/014,481, filed on Jun. 19, 2014. The entire content of U.S. Provisional Patent Application, Ser. No. 62/014,481, filed on Jun. 19, 2014, is hereby incorporated by reference.

COPYRIGHT

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights.

BACKGROUND

Many conventional accounting software applications offer features to record accounting transactions, balance a bank statement, invoice customers, pay vendors, payroll, budgeting, financial statements, and many other related tasks. With estimates of 20-25 million small businesses in the U.S., there is always a large demand for other features or tasks not offered by the conventional accounting software applications. Customers may use conventional accounting software applications for certain business applications and other software applications or services for other tasks.

For example, a user may use accounting software application A for accounting and Service B for payroll because the user wants payroll to be secured and off-site.

In another example, a user may use accounting software application A for accounting and software application C for invoicing customers As a result there is a consistent demand to transfer data to and from the accounting software applications. This data can be grouped into two types: (1) lists— a static list of vendors, customers, accounts that changes relatively seldom; and (2) transactions— daily accounting transactions like paying bills, invoicing customers, etc.

If a user is using accounting software application A and another software application B to run a business, it is likely the user may be required to transfer transactions between the two software packages regularly. Lists may need to be updated, but much less often.

Conventionally, some accounting software applications have provided a method of formatting data in a file for the purpose of importing data (both transactions and lists) into the accounting software application.

Many of these file formats are relatively difficult to use and have not been updated since the software application's initial release. In these cases, since these file formats have been the only methods to import data into the conventional accounting software applications, third party software companies have had to deal with it by providing users with the ability to create the formatted files.

For example, a payroll company may allow its customers to download a formatted file containing payroll transactions for the purpose of importing to a specific accounting software application. The customer's objective is to have all financial transactions in the accounting software application in order to have accurate financial statements.

Banks may allow customers to download banking transactions in a formatted file to import into the accounting software application.

A user may adopt the accounting software application in the middle of the year. The user wishes to have all their lists and transactions from earlier in the year, from their prior software, transferred into the newly chosen accounting software application in order to have a complete year in the newly chosen accounting software application. The user may need to find a way to create a formatted file out of their prior software.

Another issue that arises is when an existing accounting software application is re-vamped such that the formatted files associated with the pre-re-vamped accounting software application are no longer compatible for importing. This can cause a negative impact to existing users who switch over to the new software application but are using applications or services which only produce the old formatted files and do not produce the formatted files compatible for importing.

In a further situation, as illustrated in FIG. 4, a user may adopt a new accounting software application after seven months into the fiscal year and want to combine the financial data from the old software application and the financial data from the new software application into a single file to facilitate the preparation of tax returns, end of year financial statements, etc. The user may need to find a way to create a single formatted file from the two software application sources.

Thus, it is desirable to provide a solution that bridges the production of previous generation formatted files with the new format constraints for import compatibility.

BRIEF DESCRIPTION OF THE DRAWINGS

The drawings are only for purposes of illustrating various embodiments and are not to be construed as limiting, wherein:

FIG. 8 illustrates an example of a vendor table generated by the conversion process; and FIG. 9 illustrates the process of transferring the spreadsheet data to a new application.

DETAILED DESCRIPTION

Figure 1:
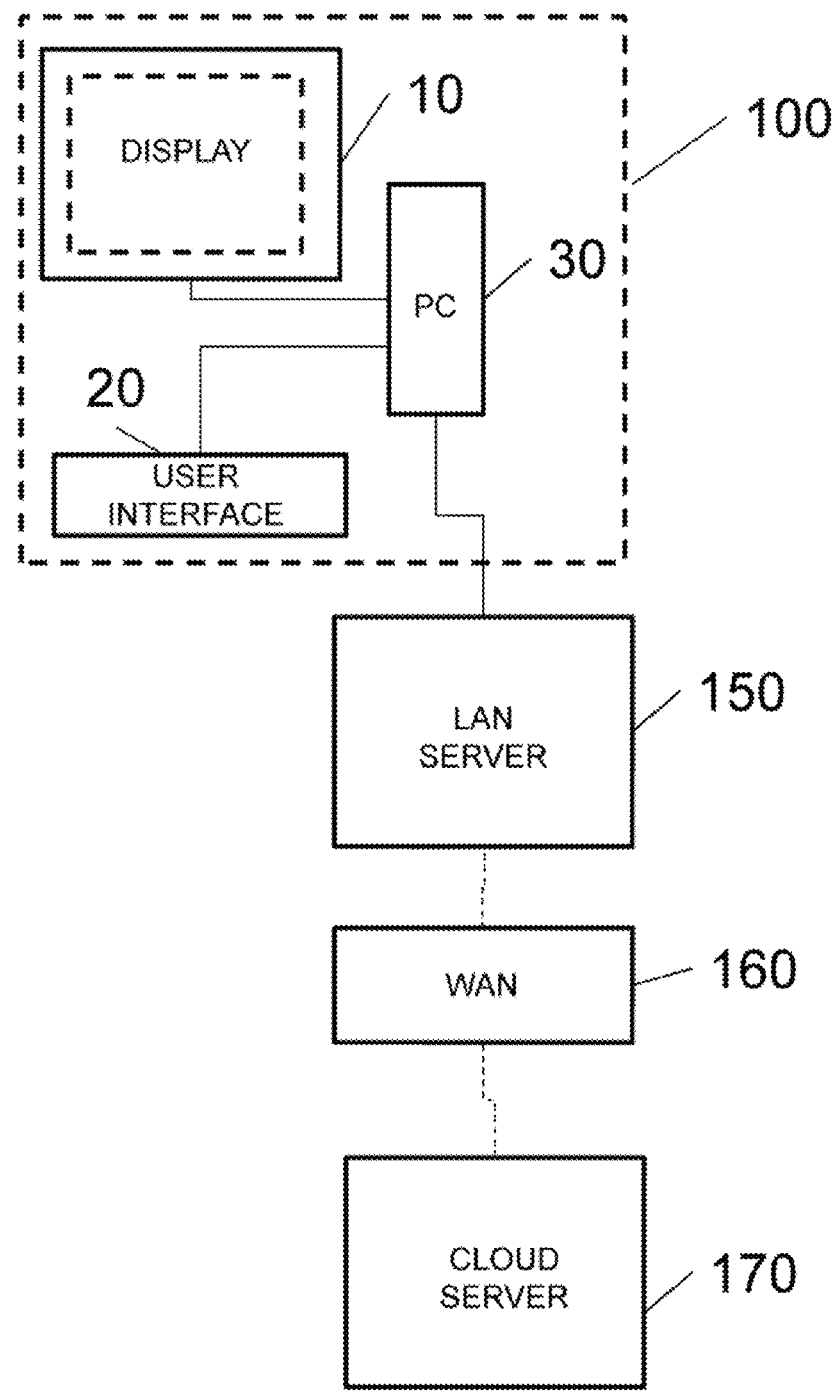
FIG. 1 illustrates a block diagram of a system for formatting data from one software application source into a format compatible for importing into another software application.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In the following description, accounting software application refers to any software application directed to accounting, payroll processing, bookkeeping, invoice processing, account payable processing, accounts receivable processing, bill payment processing, timekeeping, and/or other business based financial processes.

FIG. 1 illustrates a system for formatting data from one software application source into a format compatible for importing into another software application.

As illustrated in FIG. 1, the system includes a client computing system 100. The client computing system 100 includes a display device or screen 10, a computing device 30 (having a processor, memory, and various input/output interfaces), and user interface 20 (such as a keyboard, mouse, or other type of pointing device).

The client computing system 100 may be connected to a server 150 through a local area network. The server 150 has a processor, memory, various input/output interfaces, etc.

The accounting application software may reside upon the client computing system 100 and/or the server 150. Also, the data file for the accounting application software may reside upon the client computing system 100 and/or the server 150.

Moreover, the client computing system 100 and the server 150 may be connected to an internet (cloud) server 170 through a wide area network 160.

In this situation, the accounting application software may reside upon the client computing system 100, the server 150, and/or the internet (cloud) server 170. Also, the data file for the accounting application software may reside upon the client computing system 100, the server 150, and/or the internet (cloud) server 170.

In formatting data from one accounting software application source into a format compatible for importing into another accounting software application, the user, using the client computing system 100, opens a spreadsheet application which has been modified with an extension that allows the user to pull data from an accounting software application. The user also opens the accounting software application from which data is to be pulled.

In this modified spreadsheet application, the display device 10 may display an activatable icon within the spreadsheet application's window that can be activated by the user interface 20.

Figure 5:
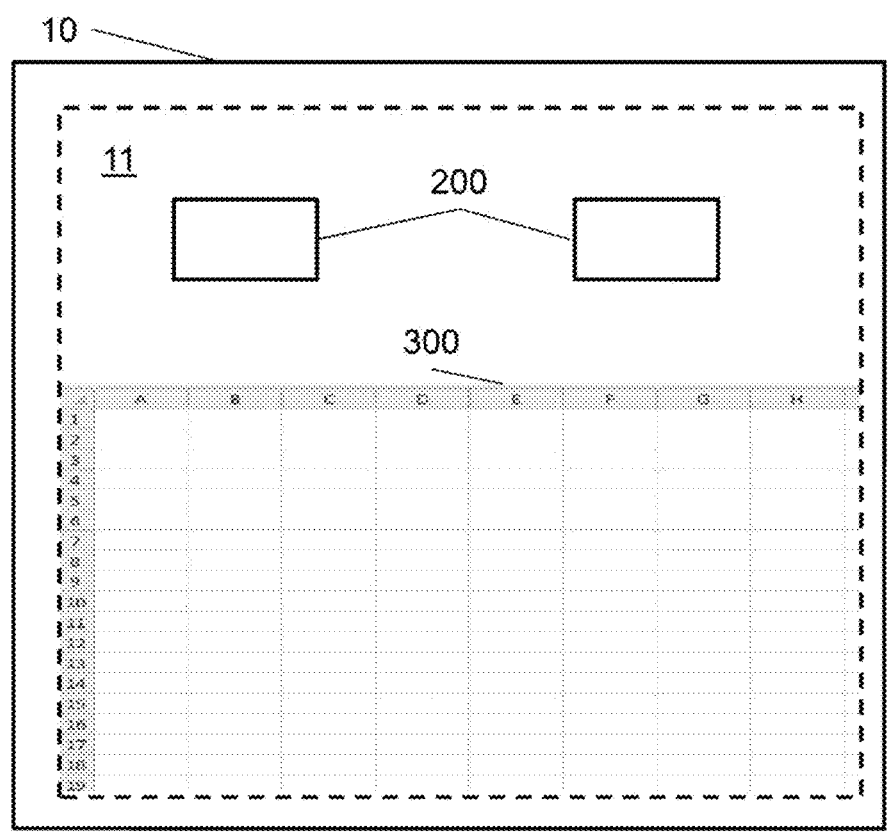
FIG. 5 illustrates an interactive window on a display screen that incorporate the format conversion functionality into a conventional spreadsheet application.

FIG. 5 illustrates an example of the spreadsheet application having activatable icons 200. As illustrated in FIG. 5, the display device 10 displays a spreadsheet application's window 11 that has activatable icons 200, for activating extensions, and a spreadsheet work area 300.

It is noted that one of the activatable icons 200, upon activation, launches (initiates) the extension which enables transfer of data from the accounting software application to the spreadsheet work area 300.

More specifically, the initiated extension electronically connects the initiated extension with the launched accounting software application, through an application program interface of the launched accounting software application to create an electronic data channel between the initiated extension and the launched accounting software application.

Figure 2:
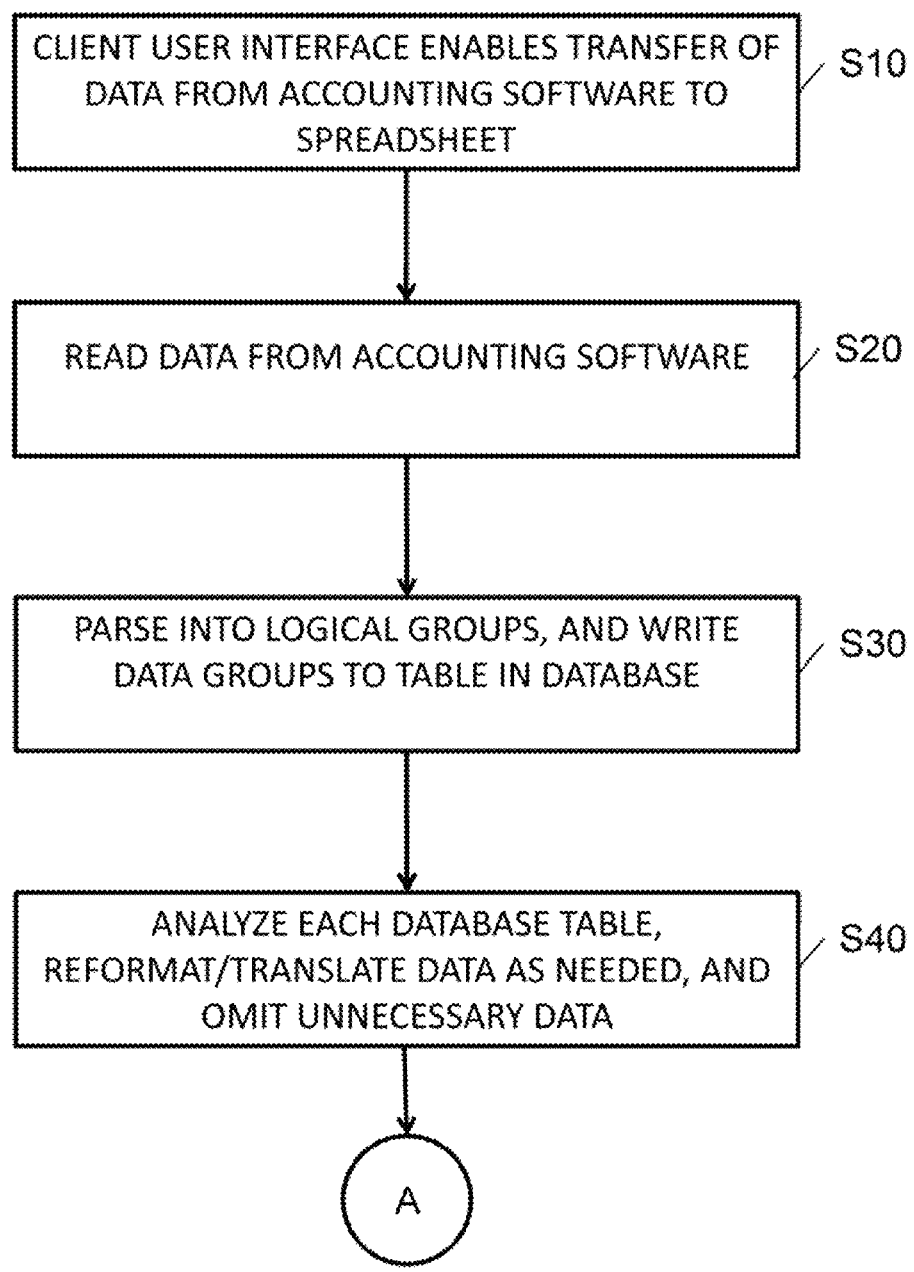
FIGS. 2 and 3 illustrate a flowchart showing the conversion of data from one format to another format.

As illustrated in FIG. 2, the user interface 20 enables transfer of data from the accounting software application to spreadsheet, at step S10. At step S20, the activated spreadsheet extension pulls data from the opened accounting software application.

It is noted that if the accounting software application needs user authentication, the extension enables the user to enter the appropriate authentication data (passwords, etc.) so that the data file associated with the accounting software application can be accessed.

Figures 6, 7:
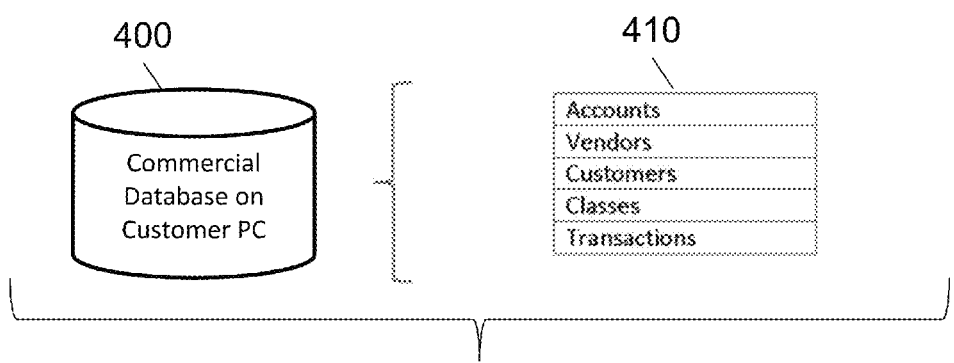
FIG. 6 illustrates a relationship between data tables and a database.
FIG. 7 illustrates a relationship between original format and new format.

At step S30, the pulled data is parsed into logical groups and the groups are written into a table in a database, as illustrated in FIG. 6. An example of a program that can facilitate the pulling, parsing, and writing of data, as discussed above, is Datablox™.

At step S40, each database table is analyzed and the data is reformatted or translated as needed. Unnecessary data can also be omitted in this step.

As illustrated in FIG. 7, the initial data may have an account type as "Bank." However, when the database is analyzed at step S40, the process recognizes that the new accounting software application does not have "Bank" as an account type. Based upon this recognition, step S40 replaces (translates) "Bank" to "Cash" as the account type.

Furthermore, as illustrated in FIG. 7, the initial data may have an account type as "Loan." However, when the database is analyzed at step S40, the process recognizes that the new accounting software application does not have "Loan" as an account type. Based upon this recognition, step S40 replaces (translates) "Loan" to "LT Liability" as the account type.

In addition, as illustrated in FIG. 7, the initial data may have an account type as "Other Expense." However, when the database is analyzed at step S40, the process recognizes that the new accounting software application has an account type specifically directed to the account "Income tax expense." Based upon this recognition, step S40 replaces (translates) "Other Expense" to "Taxes" as the account type.

It is noted that the opened accounting software application may use classes to categorize income and expenses for a single job or project. If the new accounting software application has a similar feature, but calls it projects, the class names may be translated to project names.

In analyzing the data pulled from the accounting software application, the process may utilize pre-determined maps (tables) that enable the mapping of the original account type of the original accounting software application to the new account type of the accounting software application.

For example, in the situation described above with respect to the account type "Bank," the process may include a table entry that maps "Bank" to "Cash."

It is noted that the extension may be transfer specific wherein the extension has pre-determined maps (tables) that enable the mapping of the original account type of the original accounting software application A to new accounting software application B.

It is also noted that the extension may have multiple pre-determined maps (tables), each associated with a specific transfer, such that the extension acquires from the user the identity of the original accounting software application and the identity of the new accounting software application and based upon the acquired identity information, the extension chooses the correct pre-determined maps (tables) to use in the analysis/translation routine.

It is further noted that dates (mm/yy/dd) and phone numbers (###-###-####) are often stored in different formats. Step S40 may reformat data in order for it to transfer successfully to the new accounting software application.

With respect to omitting data, if the opened accounting software application captures more data fields than the new accounting software application, the additional fields may be omitted at step S40.

Figure 3:
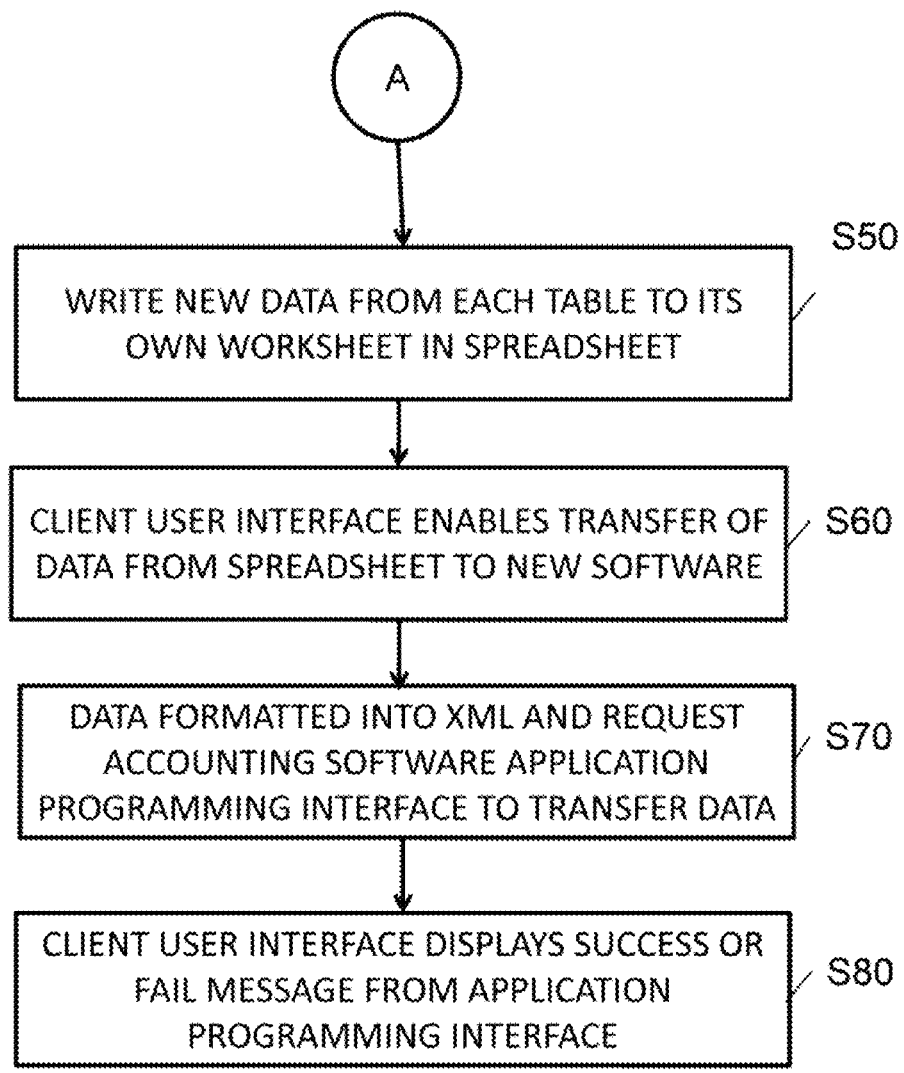
Figure 4:
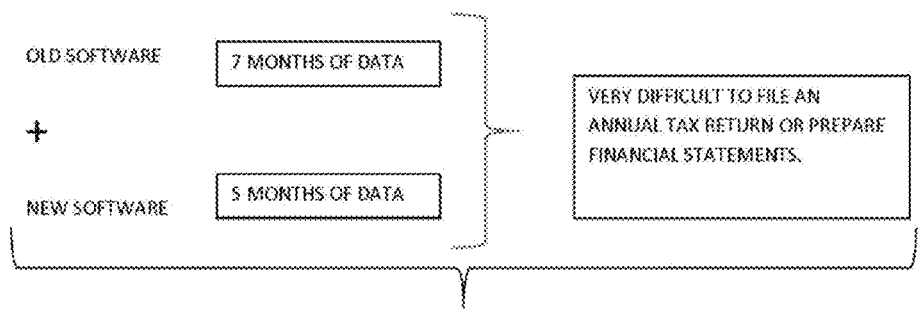
FIG. 4 illustrates an issue when utilizing two different formats.

In FIG. 3, at step S50, the new "data" is written from each table to its own worksheet in the spreadsheet. FIG. 8 illustrates an example of a vendor worksheet created from a vendor table having the new "data."

After the new data is written into the spreadsheet, the user can review and/or edit the data before the data is transferred to the new accounting software application. It is also noted that the spreadsheet can be saved for future reference.

As noted above, in the modified spreadsheet application, the display device 10 may display an activatable icon within the spreadsheet application's window that can be activated by the user interface 20.

It is noted that one of the activatable icons 200 of FIG. 5, upon activation, launches the extension which enables transfer of data from the spreadsheet work area 300 to an accounting software application (step S60 of FIG. 3).

More specifically, the initiated extension electronically connects the initiated extension with the launched accounting software application, through an application program interface of the launched accounting software application to create an electronic data channel between the initiated extension and the launched accounting software application.

Upon activation of the extension for enabling transfer of data from the spreadsheet work area 300 to an accounting software application, at step S70, the data in spreadsheet is formatted into a format that is acceptable to the new accounting software application. For example, the data in spreadsheet is formatted into XML.

At step S70, the extension makes a request of the application program interface of the new accounting software application to transfer the formatted data to the new accounting software application.

At step S80, the client computing device may display a message from the new accounting software application indicating a successful transfer or a failed transfer.

FIG. 9 illustrates the transfer of the formatted data to the new accounting software application and a response indicating the state of the transfer.

In the description above, the extension provides a software bridge (user interface in the sense that a user uses the software platform as a bridge to interface between the two accounting software applications), which can readily accept the previous generation formatted files and effectively re-format the data for importing into the new generation accounting software application. The software bridge (user interface) may be ubiquitous in that the software bridge is readily available, easy to use, and has the ability to interface with numerous applications and platforms.

An example of a possible software platform to use in generating a software bridge is Microsoft™ spreadsheet software, Excel™, because Excel™ is readily available, easy to use, and has the ability to interface with numerous applications and platforms. It is also noted that in many cases, Excel™ has built-in wizards which provide ways of importing different types of file formats.

The software platform used to create the bridge (user interface) may be based upon a programming language that enables an extension of its capabilities.

For example, Microsoft™ provides a programming language Visual Basic for Applications that extends the capability of Excel™. By programming in Visual Basic for Applications, one can create an Excel™ Add-In for a user that provides custom features. The user can run the Visual Basic for Applications program by selecting menu options or buttons right from the Excel™ menu. The benefit of an Excel™ Add-In is the user can work within Excel™ and its familiar interface. The Add-In can act on data the user has entered and saved in Excel™. The user does not need to learn new software. Installing an Add-In takes just a few clicks.

It is noted that although Microsoft™ spreadsheet software, Excel™, has been discussed above, any software platform (application) that is readily available, easy to use, has the ability to interface with numerous applications and platforms, and is based upon a programming language that enables an extension of its capabilities can be utilized.

The Add-In feature of Excel™ may transfer (export) only journal entries into the accounting software application. A journal entry is one type of transaction that is commonly entered into an accounting software application. However, there are many other types of transactions and lists that a user might possibly want to transfer to the accounting software application.

For example, the Add-In feature of Excel™ may transfer (export) bills, invoices, purchase orders, checks, bank deposits, and/or estimates.

To summarize, the software bridge transfers data from directly within the software bridge to any accounting software application that offers the necessary interface(s). The data can represent any type of financial transaction that an accounting software user might want to transfer.

The software bridge "pushes" the data from within the software bridge to the new accounting software application rather than have the data "pulled" or "imported" to the new accounting software application because the "pull" approach is much more difficult for a user because the user must comply with the data format required by the new accounting software application, or the new accounting software application may not permit importing.

However, it is noted that the user may have to pull or import the data into the new accounting software application if the new accounting software application does not have an application program interface which enables the pushing of data from the software bridge to the new accounting software application.

The following description is an example of a software bridge, using Microsoft™ spreadsheet software, Excel™, as the platform and Intuit™ QuickBooks™ Online or QuickBooks™ Desktop, as the accounting software.

In the following description, it is assumed that the user has data in Excel™ to be transferred to QuickBooks™ Online or QuickBooks™ Desktop.

When executing an Add-In feature of Excel™ (created according to the described concepts), the user should have Excel™ open with the data to be transferred appearing in the active sheet.

By clicking an Add-In feature of Excel™; for example, XLtoQB; two buttons may be displayed for activation—either an IIF format button or a Columnar format button depending upon the initial format of the data that the user wishes to export to QuickBooks™ Online or QuickBooks™ Desktop.

For first-time users, clicking either button may begin a setup process that is discussed in more detail below.

For users having completed the setup, clicking one of the buttons button will execute a Visual Basic for Applications code. An example of such source code (Source Code 1) is provided below.

Upon clicking one of the buttons, a pop-up window is displayed.

The pop-up window may include a "Login to QuickBooks" button, which when it is clicked, another windows is displayed showing an Intuit™ prompt for the QuickBooks™ Online or QuickBooks™ Desktop username and password.

This window enables the user to sign into QuickBooks™ Online. If a user has multiple companies, a user may select any of the companies. The extension may display a window notifying the user that the extension has successfully connected to QuickBooks™ Online or QuickBooks™ Desktop if the sign in data was acceptable.

The following is an example of source code for an Excel™ Add-in which provides a software bridge for transferring data formatted in the Intuit™ Interchange Format (IIF) format to QuickBooks™ Online or QuickBooks™ Desktop.

Source Code 1 takes transaction data in Excel™ and transfers it to a desktop version of QuickBooks™ or an online version of Quickbooks™ using the QuickBooks™ Software Developer Kit.

For example, if a customer has a payroll transaction file to transfer to a desktop version of QuickBooks™ or an online version of Quickbooks™, the customer can utilize Source Code 1, as set forth below, to take payroll transaction data in Excel™ and transfer it to a desktop version of QuickBooks™ or an online version of Quickbooks™.

The following source code is subject to copyright protection. The copyright owner has no objection to the facsimile reproduction by anyone of the patent document or patent disclosure, as it appears in the Patent and Trademark Office patent file or records, but otherwise reserves all copyright rights to this source code.

Source Code 1

Public Sub AddJE_FromIIF_toQBO(dataformat As String)

'key assumption is a properly formatted IIF file journal transactions is in the active sheet
'objective is to transfer this data to QuickBooks Online using the QuickBooks SDK
'dataformat argument is either "IIF" or "columnar" which identifies format of user data
'step 1 identifies column numbers
'step 2 checks data for IIF format, for missing and out of balance data
'step 3 connects to QBOE and validates accounts, classes and entities
'step 4 creates xml by looping thru each row
'step 5 the xml is passed to QB Online and connection is closed
'step 6 the response is displayed to the user On Error GoTo errHandler

'STEP 1

```
Dim ctr As Long
Dim accountcol As Long
Dim amtcol As Long
Dim datecol As Long
Dim namecol As Long
Dim classcol As Long
Dim docnumcol As Long
Dim memocol As Long
Dim firstcolofdata As Long
Dim firstrowofdata As Long
Dim lastrow As Long
Dim filewithdate As Boolean
Dim filewithname As Boolean
Dim filewithclass As Boolean
Dim filewithdocnum As Boolean
Dim filewithmemo As Boolean
Dim wksSheet As Excel.Worksheet Set wksSheet = Application.ActiveSheet 'the IIF format uses first 3 columns to define the transactions then columns 4-10 have the data for a journal entry.
'the IIF format uses first 3 rows as headers and data starts with on row 4
'the IIF format data in columns 4-10 can be in any order so we must find which column has which data.
'the columnar format expects data to begin in column 1
'the columnar format expects data to begin in row 2 since row 1 must be a header
'the columnr format data in columns 1-7 can be in any order so we must find which column has which data.
'ACCNT and AMOUNT are required for a QBOE journal entry and their presence is tested for in step 2
'DATE, NAME, CLASS, DOCNUM and MEMO are optional data filewithdate = False
filewithname = False
filewithclass = False
filewithdocnum = False
filewithmemo = False
```

```
'define first column, first row and last row of data for either IIF or columnar format
'the IIF file ends with an ENDTRNS row and the last row of data is one row before ENDTRNS
'we assume the IIF file is formatted properly and has not been edited
'we assume the columnar format may have the 2 required and 5 optional columns in any of the first 26 columns
'and that it has the required header row
Select Case dataformat
    Case "IIF"
        firstcolofdata = 4
        firstrowofdata = 4
        lastrow = Range("A" & Rows.Count).End(xlUp).Row - 1
    Case "columnar"
        firstcolofdata = 1
        firstrowofdata = 2
        lastrow = Range("A" & Rows.Count).End(xlUp).Row
End Select 'assign column numbers and determine which optional columns are being used For ctr = firstcolofdata To 26
    Select Case UCase$(wksSheet.Cells(1, ctr).Value)
        Case "ACCNT", "ACCOUNT"
        accountcol = ctr
        Case "AMOUNT"
        amtcol = ctr
        Case "DATE"
        datecol = ctr
        filewithdate = True
        Case "NAME"
        namecol = ctr
        filewithname = True
        Case "CLASS"
        classcol = ctr
        filewithclass = True
        Case "DOCNUM"
        docnumcol = ctr
        filewithdocnum = True
        Case "MEMO"
        memocol = ctr
        filewithmemo = True
    End Select
Next ctr
```

'STEP 2
'check for column headers named accnt, account or amount
If accountcol = 0 Or amtcol = 0 Then
    MsgBox "Columns titled ACCNT, or Account, and Amount are required.  The journal entry cannot be posted."
    Exit Sub
End If 'check for missing accounts and net to zero
If ErrorInData(wksSheet, lastrow, firstrowofdata, accountcol, amtcol) Then
    Exit Sub
End If 'for IIF format only check for correct format
If dataformat = "IIF" Then
    If ErrorinIIFdata(wksSheet) Then
        Exit Sub
    End If
End If

'STEP 3

'Need to know if we've begun a session so we can end it if an
'error sends us to the exception handler
Dim boolSessionBegun As Boolean
boolSessionBegun = False Application.StatusBar = "Logging on, please wait..."

Dim qbXMLRP As New QBXMLRP2Lib.RequestProcessor2

Dim ticket As String
Dim acct As String
Dim getacct As String
Dim acctlist As String
Dim cls As String
Dim getclass As String
Dim classlist As String
Dim ent As String
Dim getentity As String
Dim entitylist As String
Dim AcctErrors As Long
Dim ClassErrors As Long
Dim EntityErrors As Long

```
'Open connection to qbXMLRP COM - 1st arg is my appID, 2nd arg is my
appName
'Third argument is remoteQBOE for QB online edition and ctlocalQBD for QB
desktop software
qbXMLRP.OpenConnection2 "212143635", "XLtoQB", remoteQBOE Application.StatusBar = "Uploading data, please wait..."

' Begin Session
' First argument is for company file name.  Empty string for QBOE because
company name is provided by session ticket.
' For QB desktop either enter company file name or empty sring to use the
currently open data file.
' Second argument is single user or multi user or donotcare allows for either
  ticket = qbXMLRP.BeginSession("", QBXMLRP2Lib.qbFileOpenDoNotCare)

'check to see if accounts in excel data are all valid in QBOE.
'get a list of all accounts in QBOE
getacct = "<?xml version=""1.0"" ?><?qbxml
version=""6.0""?><QBXML><QBXMLMsgsRq
onError='stopOnError'><AccountQueryRq
requestID='1'></AccountQueryRq></QBXMLMsgsRq></QBXML>"
acctlist = qbXMLRP.ProcessRequest(ticket, getacct)

For ctr = firstrowofdata To lastrow
    'a row with ENDTRNS has no data so skip it
    If wksSheet.Cells(ctr, 1).Value = "ENDTRNS" Then
        ctr = ctr + 1
    End If
    'format the account in Excel to match the xml list of accounts from QBOE
    acct = "<FullName>" & wksSheet.Cells(ctr, accountcol).Value & "</FullName>"
    'search for a match and if not found then shade the account bold red in Excel
    If InStr(acctlist, acct) = 0 Then
        With wksSheet.Cells(ctr, accountcol)
            .Font.Bold = True
            .Font.Color = -16776961
        End With
        AcctErrors = AcctErrors + 1
    End If
    acct = ""
Next ctr
```

```
If AcctErrors > 0 Then
    MsgBox ("Invalid account(s) are in red.  No data has been transferred to QuickBooks.  Correct the account(s) and run the program again.")
    GoTo ErrorExit
End If 'if class column exists then connect to QBOE to check that all non-blank cells in that column are valid in QBOE If filewithclass Then
'check to see if classes in excel data are all valid in QBOE.
'get a list of all classes in QBOE
getclass = "<?xml version=""1.0"" ?><?qbxml version=""6.0""?><QBXML><QBXMLMsgsRq onError='stopOnError'><ClassQueryRq requestID='1'></ClassQueryRq></QBXMLMsgsRq></QBXML>"
classlist = qbXMLRP.ProcessRequest(ticket, getclass)

For ctr = firstrowofdata To lastrow
      If wksSheet.Cells(ctr, 1).Value = "ENDTRNS" Then
         ctr = ctr + 1
      End If
      If Not IsEmpty(wksSheet.Cells(ctr, classcol).Value) Then
          cls = "<Name>" & wksSheet.Cells(ctr, classcol).Value & "</Name>"
          If InStr(classlist, cls) = 0 Then
             With wksSheet.Cells(ctr, classcol)
                Selection.Font.Bold = True
                Selection.Font.Color = -16776961
             End With
             ClassErrors = ClassErrors + 1
          End If
      End If
      cls = ""
  Next ctr If ClassErrors > 0 Then
     MsgBox ("Invalid class(es) are in red.  No data has been transferred to QuickBooks.  Correct the class(es) and run the program again.")
     GoTo ErrorExit
  End If End If
```

```
'if name column exists then connect to QBOE to check that all non-blank cells in
that column are valid in QBOE If filewithname Then
    getentity = "<?xml version=""1.0"" ?><?qbxml
version=""6.0""?><QBXML><QBXMLMsgsRq
onError='stopOnError'><EntityQueryRq
requestID='1'></EntityQueryRq></QBXMLMsgsRq></QBXML>"
    entitylist = qbXMLRP.ProcessRequest(ticket, getentity)

For ctr = firstrowofdata To lastrow
     If wksSheet.Cells(ctr, 1).Value = "ENDTRNS" Then
        ctr = ctr + 1
     End If
     If Not IsEmpty(wksSheet.Cells(ctr, namecol).Value) Then
        ent = "<Name>" & wksSheet.Cells(ctr, namecol).Value & "</Name>"
        If InStr(entitylist, ent) = 0 Then
           With wksSheet.Cells(ctr, namecol)
              Selection.Font.Bold = True
              Selection.Font.Color = -16776961
           End With
           EntityErrors = EntityErrors + 1
        End If
     End If
     ent = ""
  Next ctr If EntityErrors > 0 Then
     MsgBox ("Invalid name(s) are in red.  No data has been imported.  Correct
the name(s) and run the program again.")
     GoTo ErrorExit
  End If
End If
```

'STEP 4
'create the xml doc for the entry
'a separate journalentryadd is created for each set of TRNS/ENDTRNS data in Excel

```
Dim je As String
Dim jeheader As String
Dim jefooter As String
Dim jeline As String
Dim xmlheader As String
Dim xmlfooter As String
Dim totalje As String
Dim dt As String
Dim refnumber As String
xmlheader = "<?xml version=""1.0"" ?>" & "<?qbxml version=""6.0""?>" & "<QBXML>" & "<QBXMLMsgsRq onError = 'stopOnError'>"
xmlfooter = "</QBXMLMsgsRq>" & "</QBXML>"

For ctr = firstrowofdata To lastrow

'date and refnumber (docnum) are assigned to a QBOE journal entry header and not each journal entry line
    'so their values are assigned prior to the loop below that creates each journal entry line.
    'date and refnumber (docnum) are taken from each TRNS row of which row 4 is the first.
    'date is optional and if that column does not exist we default to date of import
    If filewithdate Then
        dt = Format(wksSheet.Cells(ctr, datecol), "yyyy-mm-dd")
    Else
        dt = Format(Date, "yyyy-mm-dd")
    End If
```

```
'set the refnumber to docnum if one exists
If filewithdocnum Then
    refnumber = Left(wksSheet.Cells(ctr, docnumcol), 21)
End If 'for IIF format loop thru one TRNS block until reaching ENDTRNS.  For columnar format loop thru all rows until last one.
    Do Until wksSheet.Cells(ctr, 1).Value = "ENDTRNS" Or ctr = lastrow + 1
        If wksSheet.Cells(ctr, amtcol).Value > 0 Then
        'debit line when positive amount in Excel data
            jeline = jeline & "<JournalDebitLine>"
            jeline = jeline & "<AccountRef><FullName>" & wksSheet.Cells(ctr, accountcol) & "</FullName></AccountRef>"
            jeline = jeline & "<Amount>" & Format(wksSheet.Cells(ctr, amtcol), "#.00") & "</Amount>"
            'if memo exists then use it, blanks not a problem
            If filewithmemo Then
                jeline = jeline & "<Memo>" & wksSheet.Cells(ctr, memocol) & "</Memo>"

End If
        'name is optional but blank names return an error so skip over empty cells
        If filewithname And Not IsEmpty(wksSheet.Cells(ctr, namecol).Value) Then
            jeline = jeline & "<EntityRef><FullName>" & wksSheet.Cells(ctr, namecol) & "</FullName></EntityRef>"
        End If
        'class is optional but blank classes return an error so skip over empty cells
        If filewithclass And Not IsEmpty(wksSheet.Cells(ctr, classcol).Value) Then
            jeline = jeline & "<ClassRef><FullName>" & wksSheet.Cells(ctr, classcol) & "</FullName></ClassRef>"
        End If
        jeline = jeline & "</JournalDebitLine>"
```

```
      End If
     If wksSheet.Cells(ctr, amtcol).Value < 0 Then

'credit line when negative amount in Excel data
        jeline = jeline & "<JournalCreditLine>"
        jeline = jeline & "<AccountRef><FullName>" & wksSheet.Cells(ctr,
accountcol) & "</FullName></AccountRef>"
        jeline = jeline & "<Amount>" & Format(Abs(wksSheet.Cells(ctr, amtcol)),
"#.00") & "</Amount>"
        'if memo exists then use it, blanks not a problem
        If filewithmemo Then
           jeline = jeline & "<Memo>" & wksSheet.Cells(ctr, memocol) &
"</Memo>"
        End If
        'name is optional but blank names return an error so skip over empty cells
        If filewithname And Not IsEmpty(wksSheet.Cells(ctr, namecol).Value)
Then
           jeline = jeline & "<EntityRef><FullName>" & wksSheet.Cells(ctr,
namecol) & "</FullName></EntityRef>"
        End If
        'class is optional but blank classes return an error so skip over empty
cells
        If filewithclass And Not IsEmpty(wksSheet.Cells(ctr, classcol).Value)
Then
           jeline = jeline & "<ClassRef><FullName>" & wksSheet.Cells(ctr,
classcol) & "</FullName></ClassRef>"
        End If
        jeline = jeline & "</JournalCreditLine>"
     End If
    ctr = ctr + 1
  Loop
  'reached an ENDTRNS now write the entry
  jeheader = "<JournalEntryAddRq requestID = '2'>" & "<JournalEntryAdd>"
  jeheader = jeheader & "<TxnDate>" & dt & "</TxnDate>"
  'if data has both a MEMO and DOCNUM we put DOCNUM value in
<refnumber>
  If filewithdocnum Then
     jeheader = jeheader & "<RefNumber>" & refnumber & "</RefNumber>"
```

```
End If
    jeheader = jeheader & "<Memo>Imported</Memo>"
    jefooter = "</JournalEntryAdd>" & "</JournalEntryAddRq>"
    je = je & jeheader & jeline & jefooter
    jeline = ""

Next ctr totalje = xmlheader & je & xmlfooter
```

'STEP 5

```
Dim post As String

'send request to QB Online
post = qbXMLRP.ProcessRequest(ticket, totalje)

'close session and connection
qbXMLRP.EndSession ticket
boolSessionBegun = False
qbXMLRP.CloseConnection
```

'STEP 6
```
'parse response using DOM
Dim retStatusCode As String
Dim retStatusMessage As String
Dim retStatusSeverity As String ' Create xmlDoc Obj
Dim xmlDoc As MSXML2.DOMDocument
Set xmlDoc = New MSXML2.DOMDocument
xmlDoc.async = False
xmlDoc.LoadXML post Dim objNodeList As MSXML2.IXMLDOMNodeList
Set objNodeList = xmlDoc.getElementsByTagName("JournalEntryAddRs")

Dim attrNamedNodeMap As MSXML2.IXMLDOMNamedNodeMap
Set attrNamedNodeMap = objNodeList.Item(0).Attributes
```

```
' Get the status Code, message and Severity
retStatusCode = attrNamedNodeMap.getNamedItem("statusCode").NodeValue
retStatusSeverity =
attrNamedNodeMap.getNamedItem("statusSeverity").NodeValue
retStatusMessage =
attrNamedNodeMap.getNamedItem("statusMessage").NodeValue
If retStatusCode = 0 Then
    MsgBox "Data transferred successfully to QuickBooks Online."
Else
MsgBox retStatusMessage & " " & retStatusCode
End If ErrorExit:

Application.StatusBar = False

If boolSessionBegun Then
    qbXMLRP.EndSession ticket
    qbXMLRP.CloseConnection
End If
Exit Sub
'GoTo ErrorExit errHandler:
If Err.Number = &H80040420 Then
    MsgBox "Operation cancelled"
    Else
    MsgBox "HRESULT = " & Err.Number & " (" & Hex(Err.Number) & ") " & vbCrLf
& vbCrLf & Err.Description
End If
Resume ErrorExit End Sub Public Function ErrorInData(ByRef wksSheet As Excel.Worksheet, ByVal lastrow
As Integer, ByVal firstrowofdata As Integer, ByVal accountcolumn As Integer,
ByVal amtcolumn As Integer) As Boolean 'check for missing accounts in the excel data Dim rowctr As Long
```

```
For rowctr = firstrowofdata To lastrow
   If wksSheet.Cells(rowctr, 1).Value = "ENDTRNS" Then
      rowctr = rowctr + 1
   End If
   If IsEmpty(wksSheet.Cells(rowctr, accountcolumn).Value) Then
      MsgBox "There are one or more accounts missing.  The journal entry cannot be posted."
      ErrorInData = True
      Exit Function
   End If Next rowctr 'check to see that amounts sum to zero Dim amtsum As Currency amtsum = 0
For rowctr = firstrowofdata To lastrow
   If wksSheet.Cells(rowctr, 1).Value = "ENDTRNS" Then
      rowctr = rowctr + 1
   End If
   amtsum = amtsum + wksSheet.Cells(rowctr, amtcolumn).Value
Next rowctr
   If amtsum <> 0 Then
      MsgBox "The amount column does not sum to zero.  The journal entry cannot be posted."
      ErrorInData = True
      Exit Function
   End If End Function Public Sub callback(control As IRibbonControl)
   AddJE_FromIIF_toQBO ("columnar")

End Sub

Public Function ErrorinIIFdata(ByRef wksSheet As Excel.Worksheet) As Boolean

'check to see if a properly formatted IIF file exists by testing cells A1:A3 and B1:B2
```

```
Dim iifheader As String iifheader = wksSheet.Cells(1, 1).Value & wksSheet.Cells(2, 1) &
wksSheet.Cells(3, 1) & wksSheet.Cells(1, 2) & wksSheet.Cells(2, 2)
If iifheader <> "!TRNS!SPL!ENDTRNSTRNSIDSPLID" Then
    MsgBox ("This does not appear to be a properly formatted IIF file.  The expected values in cells A1, A2, A3, B1 and B2 are !TRNS !SPL !ENDTRNS TRNSID SPLID respectively.")
    ErrorinIIFdata = True
    Exit Function
End If End Function
```

Using a ubiquitous spreadsheet program as the tool to transfer data, as described above, simplifies the task of transferring data between accounting software applications.

In the explanation below, let the accounting software application, from which data is being taken, be named OLD and the target accounting software application be named NEW. The user opens the spreadsheet. It is noted that the data can be extracted from either desktop software or Online.

To initiate the process, a user activates an extension which launches software development kit (SDK) tools to extract data from OLD accounting software application. Authentication may be required by the OLD accounting software application to obtain permission to extract data.

Then the selected data is read and it is determined what data fields in OLD accounting software application can be successfully imported into NEW accounting software application. For example, if a fax number is in OLD accounting software application but not NEW accounting software application, that data field may be omitted.

The data from OLD accounting software application is reformatted to NEW accounting software application as needed. For example, if zip code in OLD accounting software application is nine digits and zip code in the NEW accounting software application is five digits, the last four digits are removed from OLD accounting software application data. The data is displayed in the correct columns as specified by the NEW accounting software application so the spreadsheet can be imported into NEW accounting software application.

The data is formatted to the NEW accounting software application's specifications. In other words, the user can now sign into NEW accounting software application and follow the instructions for importing a spreadsheet to have all their customers appear in the NEW accounting software application.

In another example, let the payroll service, from which the data that is being taken, be named PR and the target online accounting software be named OA.

Payroll service bureaus commonly create files in an IIF or columnar format. These files contain the data representing a journal entry for the payroll expenses for a given pay period. In this example, it is assumed the user has downloaded an IIF file from PR.

The user is instructed to open the IIF file with the spreadsheet.

Upon clicking on an extension in the spreadsheet application associated with IIF format, the data in the spreadsheet is evaluated to make sure it is in IIF format (the user may have modified it by mistake). Error messages will appear if the data does not comply with IIF format.

The data in the spreadsheet is checked for other error conditions. The amount column must sum to zero (debits=credits). Every row having an amount must have an Account. Error messages will appear if these criteria are not satisfied.

The data is written to an XML document that conforms to the OA's journal entry specification.

Using the OA's software development tools, a connection is made to the OA. Authentication may be required by the user.

The XML document is passed to the OA, and the journal entry can be seen by the user when the user logins to the OA.

Source Code 2 extracts transactions and lists from a desktop version of QuickBooks™ or an online version of Quickbooks™ writes the transactions and lists in an Excel™ workbook or worksheet.

For example, if a customer wants to stop using a desktop version of QuickBooks™ or an online version of Quickbooks™, the customer can utilize Source Code 2, as set forth below, to transfer the data from the desktop version of QuickBooks™ or the online version of Quickbooks™ to the new accounting software application.

The following example of source code (Source Code 2) is subject to copyright protection. The copyright owner has no objection to the facsimile reproduction by anyone of the patent document or patent disclosure, as it appears in the Patent and Trademark Office patent file or records, but otherwise reserves all copyright rights to this source code.

Source Code 2

```
Option Explicit
Public Sub Getcustomers(edition As String)

'10-31-13 purpose is to query customers from QB desktop or Online
'3-11-14 updated On Error GoTo errHandler:

Dim custlist As String
Dim wksSheet As Excel.Worksheet
Dim lastrow As Long
Dim qbXMLRP As QBXMLRP2Lib.RequestProcessor2
Dim ticket As String
Dim getcust As String Set wksSheet = Application.ActiveSheet
    Cells.Select
    Selection.ClearContents
```

```
'Need to know if we've begun a session so we can end it if an
'error sends us to the exception handler
Dim boolSessionBegun As Boolean
boolSessionBegun = False 'Open connection to qbXMLRP COM - 1st arg is my appID, 2nd arg is my
appName
'Third argument is localQBD for QB desktop software or remoteQBOE for online
edition
Set qbXMLRP = New QBXMLRP2Lib.RequestProcessor2
If edition = "QBOE" Then
    qbXMLRP.OpenConnection2 "212143635", "XLtoQB", remoteQBOE
ElseIf edition = "QB" Then
    qbXMLRP.OpenConnection2 "212143635", "XLtoQB", localQBD
End If ' Begin Session
' First argument is for company file name.
' For QB desktop either enter company file name or empty sring to use the
currently open data file.
' Second argument is single user or multi user or donotcare allows for either
 ticket = qbXMLRP.BeginSession("", QBXMLRP2Lib.qbFileOpenDoNotCare)

'get a list of all customers in QBOE
getcust = "<?xml version=""1.0"" ?><?qbxml
version=""6.0""?><QBXML><QBXMLMsgsRq
onError='stopOnError'><CustomerQueryRq
requestID='1'></CustomerQueryRq></QBXMLMsgsRq></QBXML>"
custlist = qbXMLRP.ProcessRequest(ticket, getcust)

'close session and connection
qbXMLRP.EndSession ticket
boolSessionBegun = False
qbXMLRP.CloseConnection 'parse response using DOM
Dim retStatusCode As String
Dim retStatusMessage As String
Dim retStatusSeverity As String
Dim CustBillAddr1 As String
Dim CustBillCity As String
Dim CustBillState As String
Dim CustBillZip As String
Dim CustEmail As String
Dim CustFullName As String
Dim custPhone As String
```

```
Dim custFax As String
Dim CustFirstName As String
Dim CustLastName As String
Dim ctr As Long ' Create xmlDoc Obj
Dim xmlDoc As New DOMDocument40
Dim objNodeList As IXMLDOMNodeList ' Node objects
Dim objChild As IXMLDOMNode
Dim custChildNode As IXMLDOMNode
Dim attrNamedNodeMap As IXMLDOMNamedNodeMap
Dim i As Integer
Dim ret As Boolean
Dim errorMsg As String 'add header to Excel sheet
wksSheet.Cells(1, 1).Value = "Company Name"
wksSheet.Cells(1, 2).Value = "Email"
wksSheet.Cells(1, 3).Value = "First Name"
wksSheet.Cells(1, 4).Value = "Last Name"
wksSheet.Cells(1, 5).Value = "Street Address"
wksSheet.Cells(1, 6).Value = "Street Address 2"
wksSheet.Cells(1, 7).Value = "City"
wksSheet.Cells(1, 8).Value = "Province/State"
wksSheet.Cells(1, 9).Value = "Country"
wksSheet.Cells(1, 10).Value = "Postal/Zip Code"
wksSheet.Cells(1, 11).Value = "Phone"
wksSheet.Cells(1, 12).Value = "Fax"

' Get CustomerRet nodes list
ctr = 2
xmlDoc.LoadXML custlist
Set objNodeList = xmlDoc.getElementsByTagName("CustomerRet")

For i = 0 To (objNodeList.Length - 1)

For Each objChild In objNodeList.Item(i).ChildNodes
        If objChild.nodeName = "FullName" Then
            CustFullName = objChild.Text
        ElseIf objChild.nodeName = "Phone" Then
            custPhone = objChild.Text
        ElseIf objChild.nodeName = "Email" Then
            CustEmail = objChild.Text
        ElseIf objChild.nodeName = "Fax" Then
```

```
        custFax = objChild.Text
    ElseIf objChild.nodeName = "FirstName" Then
        CustFirstName = objChild.Text
    ElseIf objChild.nodeName = "LastName" Then
        CustLastName = objChild.Text
    End If ' Get the billing address block
    If objChild.nodeName = "BillAddress" Then
    ' Get the elements in this block
        For Each custChildNode In objChild.ChildNodes
            If custChildNode.nodeName = "Addr1" Then
                CustBillAddr1 = custChildNode.Text
            ElseIf custChildNode.nodeName = "City" Then
                CustBillCity = custChildNode.Text
            ElseIf custChildNode.nodeName = "State" Then
                CustBillState = custChildNode.Text
            ElseIf custChildNode.nodeName = "PostalCode" Then
                CustBillZip = custChildNode.Text
            End If
        Next
    End If      'End of billaddress
Next ' End of customerRet
wksSheet.Cells(ctr, 1).Value = CustFullName
wksSheet.Cells(ctr, 2).Value = CustEmail
wksSheet.Cells(ctr, 3).Value = CustFirstName
wksSheet.Cells(ctr, 4).Value = CustLastName
wksSheet.Cells(ctr, 5).Value = CustBillAddr1
wksSheet.Cells(ctr, 7).Value = CustBillCity
wksSheet.Cells(ctr, 8).Value = getstate(CustBillState)
wksSheet.Cells(ctr, 9).Value = "United States of America"
wksSheet.Cells(ctr, 10).Value = CustBillZip
wksSheet.Cells(ctr, 11).Value = custPhone
wksSheet.Cells(ctr, 12).Value = custFax
ctr = ctr + 1
CustFullName = ""
CustEmail = ""
CustFirstName = ""
CustLastName = ""
CustBillAddr1 = ""
CustBillCity = ""
CustBillState = ""
CustBillZip = ""
custPhone = ""
custFax = ""
```

```
Next
   Cells.Select
   Cells.EntireColumn.AutoFit
   Application.GetSaveAsFilename ("Vendors")
Exit Sub errHandler:
If Err.Number = &H80040420 Then
   MsgBox "Operation cancelled"
   Else
   MsgBox "HRESULT = " & Err.Number & " (" & Hex(Err.Number) & ") " & vbCrLf & vbCrLf & Err.Description
End If End Sub Public Sub Getvendors(edition As String)

'10-31-13 purpose is to query vendors from QB desktop or Online
'3-11-14 updated On Error GoTo errHandler:

Dim vendlist As String
Dim wksSheet As Excel.Worksheet
Dim lastrow As Long
Dim qbXMLRP As QBXMLRP2Lib.RequestProcessor2
Dim ticket As String
Dim getvend As String Set wksSheet = Application.ActiveSheet
   Cells.Select
   Selection.ClearContents 'Need to know if we've begun a session so we can end it if an
'error sends us to the exception handler
Dim boolSessionBegun As Boolean
boolSessionBegun = False
```

```
'Open connection to qbXMLRP COM - 1st arg is my appID, 2nd arg is my
appName
'Third argument is localQBD for QB desktop software or remoteQBOE for online
Set qbXMLRP = New QBXMLRP2Lib.RequestProcessor2
If edition = "QBOE" Then
    qbXMLRP.OpenConnection2 "212143635", "XLtoQB", remoteQBOE
ElseIf edition = "QB" Then
    qbXMLRP.OpenConnection2 "212143635", "XLtoQB", localQBD
End If ' Begin Session
' First argument is for company file name.
' For QB desktop either enter company file name or empty sring to use the
currently open data file.
' Second argument is single user or multi user or donotcare allows for either
 ticket = qbXMLRP.BeginSession("", QBXMLRP2Lib.qbFileOpenDoNotCare)

'get a list of all vendors in QBOE
getvend = "<?xml version=""1.0"" ?><?qbxml
version=""6.0""?><QBXML><QBXMLMsgsRq
onError='stopOnError'><VendorQueryRq
requestID='1'></VendorQueryRq></QBXMLMsgsRq></QBXML>"
vendlist = qbXMLRP.ProcessRequest(ticket, getvend)

'close session and connection
qbXMLRP.EndSession ticket
boolSessionBegun = False
qbXMLRP.CloseConnection 'parse response using DOM
Dim retStatusCode As String
Dim retStatusMessage As String
Dim retStatusSeverity As String
Dim vendBillAddr1 As String
Dim vendBillCity As String
Dim vendBillState As String
Dim vendBillZip As String
Dim vendEmail As String
Dim vendFullName As String
Dim vendPhone As String
Dim vendFax As String
Dim vendFirstName As String
Dim vendLastName As String
Dim ctr As Long
```

```
' Create xmlDoc Obj
Dim xmlDoc As New DOMDocument40
Dim objNodeList As IXMLDOMNodeList ' Node objects
Dim objChild As IXMLDOMNode
Dim custChildNode As IXMLDOMNode
Dim attrNamedNodeMap As IXMLDOMNamedNodeMap
Dim i As Integer
Dim ret As Boolean
Dim errorMsg As String 'add header to Excel sheet
wksSheet.Cells(1, 1).Value = "Company Name"
wksSheet.Cells(1, 2).Value = "Email"
wksSheet.Cells(1, 3).Value = "First Name"
wksSheet.Cells(1, 4).Value = "Last Name"
wksSheet.Cells(1, 5).Value = "Street Address"
wksSheet.Cells(1, 6).Value = "Street Address 2"
wksSheet.Cells(1, 7).Value = "City"
wksSheet.Cells(1, 8).Value = "Province/State"
wksSheet.Cells(1, 9).Value = "Country"
wksSheet.Cells(1, 10).Value = "Postal/Zip Code"
wksSheet.Cells(1, 11).Value = "Phone"
wksSheet.Cells(1, 12).Value = "Fax"

' Get VendorRet nodes list
ctr = 2
xmlDoc.LoadXML vendlist
Set objNodeList = xmlDoc.getElementsByTagName("VendorRet")
```

```
For i = 0 To (objNodeList.Length - 1)

For Each objChild In objNodeList.Item(i).ChildNodes
        If objChild.nodeName = "CompanyName" Then
            vendFullName = objChild.Text
        ElseIf objChild.nodeName = "Phone" Then
            vendPhone = objChild.Text
        ElseIf objChild.nodeName = "Email" Then
            vendEmail = objChild.Text
        ElseIf objChild.nodeName = "Fax" Then
            vendFax = objChild.Text
        ElseIf objChild.nodeName = "FirstName" Then
            vendFirstName = objChild.Text
        ElseIf objChild.nodeName = "LastName" Then
            vendLastName = objChild.Text
        End If ' Get the billing address block
        If objChild.nodeName = "VendorAddress" Then
        ' Get the elements in this block
            For Each custChildNode In objChild.ChildNodes
                If custChildNode.nodeName = "Addr1" Then
                    vendBillAddr1 = custChildNode.Text
                ElseIf custChildNode.nodeName = "City" Then
                    vendBillCity = custChildNode.Text
                ElseIf custChildNode.nodeName = "State" Then
                    vendBillState = custChildNode.Text
                ElseIf custChildNode.nodeName = "PostalCode" Then
                    vendBillZip = custChildNode.Text
                End If
            Next
        End If       'End of billaddress
    Next ' End of vendorRet
    wksSheet.Cells(ctr, 1).Value = vendFullName
    wksSheet.Cells(ctr, 2).Value = vendEmail
    wksSheet.Cells(ctr, 3).Value = vendFirstName
    wksSheet.Cells(ctr, 4).Value = vendLastName
    wksSheet.Cells(ctr, 5).Value = vendBillAddr1
    wksSheet.Cells(ctr, 7).Value = vendBillCity
    wksSheet.Cells(ctr, 8).Value = getstate(vendBillState)
    wksSheet.Cells(ctr, 9).Value = "United States of America"
    wksSheet.Cells(ctr, 10).Value = vendBillZip
    wksSheet.Cells(ctr, 11).Value = vendPhone
    wksSheet.Cells(ctr, 12).Value = vendFax
    ctr = ctr + 1
```

```
           vendFullName = ""
           vendEmail = ""
           vendFirstName = ""
           vendLastName = ""
           vendBillAddr1 = ""
           vendBillCity = ""
           vendBillState = ""
           vendBillZip = ""
           vendPhone = ""
           vendFax = ""
Next
   Cells.Select
   Cells.EntireColumn.AutoFit
Exit Sub errHandler:
If Err.Number = &H80040420 Then
   MsgBox "Operation cancelled"
   Else
   MsgBox "HRESULT = " & Err.Number & " (" & Hex(Err.Number) & ") " & vbCrLf
& vbCrLf & Err.Description
End If End Sub Public Function getstate(s As String)
Select Case s
     Case "NY"
        getstate = "New York"
     Case "TX"
        getstate = "Texas"
     Case "WA"
        getstate = "Washington"
     Case "GA"
        getstate = "Georgia"
     Case "NE"
        getstate = "Nebraska"
     End Select
End Function Public Sub getaccounts(edition As String)
'10-31-13 purpose is to query acccounts from QB desktop or Online
'3-11-14 updated On Error GoTo errHandler:
```

```
Dim acctlist As String
Dim wksSheet As Excel.Worksheet
Dim lastrow As Long
Dim qbXMLRP As QBXMLRP2Lib.RequestProcessor2
Dim ticket As String
Dim getacct As String Set wksSheet = Application.ActiveSheet
    Cells.Select
    Selection.ClearContents 'Need to know if we've begun a session so we can end it if an
'error sends us to the exception handler
Dim boolSessionBegun As Boolean
boolSessionBegun = False 'Open connection to qbXMLRP COM - 1st arg is my appID, 2nd arg is my
appName
'Third argument is localQBD for QB desktop software or remoteQBOE for online
Set qbXMLRP = New QBXMLRP2Lib.RequestProcessor2
If edition = "QBOE" Then
    qbXMLRP.OpenConnection2 "212143635", "XLtoQB", remoteQBOE
ElseIf edition = "QB" Then
    qbXMLRP.OpenConnection2 "212143635", "XLtoQB", localQBD
End If ' Begin Session
' First argument is for company file name.
' For QB desktop either enter company file name or empty sring to use the
currently open data file.
' Second argument is single user or multi user or donotcare allows for either
 ticket = qbXMLRP.BeginSession("", QBXMLRP2Lib.qbFileOpenDoNotCare)

'get a list of all accounts in QBOE
getacct = "<?xml version=""1.0"" ?><?qbxml
version=""6.0""?><QBXML><QBXMLMsgsRq
onError='stopOnError'><AccountQueryRq
requestID='1'></AccountQueryRq></QBXMLMsgsRq></QBXML>"
acctlist = qbXMLRP.ProcessRequest(ticket, getacct)

'close session and connection
qbXMLRP.EndSession ticket
boolSessionBegun = False
qbXMLRP.CloseConnection
```

```
'parse response using DOM
Dim retStatusCode As String
Dim retStatusMessage As String
Dim retStatusSeverity As String
Dim acctname As String
Dim acctnum As String
Dim accttype As String
Dim descript As String
Dim db As Double
Dim cr As Double
Dim ctr As Long 'Create xmlDoc Obj
Dim xmlDoc As New DOMDocument40
Dim objNodeList As IXMLDOMNodeList 'Node objects
Dim objChild As IXMLDOMNode
Dim custChildNode As IXMLDOMNode
Dim attrNamedNodeMap As IXMLDOMNamedNodeMap
Dim i As Integer
Dim ret As Boolean
Dim errorMsg As String 'add header to Excel sheet
wksSheet.Cells(1, 1).Value = "Account Number"
wksSheet.Cells(1, 2).Value = "Account Name"
wksSheet.Cells(1, 3).Value = "Account Type"
'wksSheet.Cells(1, 4).Value = "Description"
'wksSheet.Cells(1, 5).Value = "Debit"
'wksSheet.Cells(1, 6).Value = "Credit"

'Get AccountRet nodes list ctr = 2
xmlDoc.LoadXML acctlist
Set objNodeList = xmlDoc.getElementsByTagName("AccountRet")

For i = 0 To (objNodeList.Length - 1)

For Each objChild In objNodeList.Item(i).ChildNodes
        If objChild.nodeName = "FullName" Then
            acctname = objChild.Text
        ElseIf objChild.nodeName = "AccountNumber" Then
            acctnum = objChild.Text
        ElseIf objChild.nodeName = "AccountType" Then
```

```
            accttype = objChild.Text
        ElseIf objChild.nodeName = "Desc" Then
            descript = objChild.Text
        ElseIf objChild.nodeName = "Balance" Then
            db = objChild.Text
        End If
    Next wksSheet.Cells(ctr, 1).Value = acctnum
    wksSheet.Cells(ctr, 2).Value = acctname
    wksSheet.Cells(ctr, 3).Value = accttype
'   wksSheet.Cells(ctr, 4).Value = descript
'   wksSheet.Cells(ctr, 5).Value = db
'   wksSheet.Cells(ctr, 5).Value = cr
    ctr = ctr + 1
    acctnum = ""
    acctname = ""
    accttype = ""
    descript = ""
'   db = ""
'   cr = ""
Next
    Cells.Select
    Cells.EntireColumn.AutoFit
Exit Sub errHandler:
If Err.Number = &H80040420 Then
    MsgBox "Operation cancelled"
Else
    MsgBox "HRESULT = " & Err.Number & " (" & Hex(Err.Number) & ") " & vbCrLf & vbCrLf & Err.Description
End If End Sub Public Sub callback(control As IRibbonControl)
    Select Case control.Tag
    Case "QB_Cust": Getcustomers ("QB")
    Case "QBOE_Cust": Getcustomers ("QBOE")
    Case "QB_Vend": Getvendors ("QB")
    Case "QBOE_Vend": Getvendors ("QBOE")
    Case "QB_Acct": getaccounts ("QB")
    Case "QBOE_Acct": getaccounts ("QBOE")
    Case "QB_Trans": gettrans ("QB")
```

```
    Case "QBOE_Trans": gettrans ("QBOE")
    End Select

End Sub

Public Sub gettrans(edition As String)

'3-14-14 purpose is to query a detailed transaction report from QB desktop or
Online 'On Error GoTo errHandler:

Dim trans As String
Dim wksSheet As Excel.Worksheet
Dim qbXMLRP As QBXMLRP2Lib.RequestProcessor2
Dim ticket As String
Dim report As String Set wksSheet = Application.ActiveSheet
    Cells.Select
    Selection.ClearContents 'Need to know if we've begun a session so we can end it if an
'error sends us to the exception handler
Dim boolSessionBegun As Boolean
boolSessionBegun = False 'Open connection to qbXMLRP COM - 1st arg is my appID, 2nd arg is my
appName
'Third argument is localQBD for QB desktop software or remoteQBOE for online
Set qbXMLRP = New QBXMLRP2Lib.RequestProcessor2
If edition = "QBOE" Then
    qbXMLRP.OpenConnection2 "212143635", "XLtoQB", remoteQBOE
ElseIf edition = "QB" Then
    qbXMLRP.OpenConnection2 "212143635", "XLtoQB", localQBD
End If
```

```
' Begin Session
' First argument is for company file name.
' For QB desktop either enter company file name or empty sring to use the
currently open data file.
' Second argument is single user or multi user or donotcare allows for either
  ticket = qbXMLRP.BeginSession("", QBXMLRP2Lib.qbFileOpenDoNotCare)

'get the customer detail transaction register for this year to date
'in the response we want all elements in <DataRow> trans = "<?xml version=""1.0"" ?><?qbxml
version=""6.0""?><QBXML><QBXMLMsgsRq
onError='continueOnError'><CustomDetailReportQueryRq
requestID='UUIDTYPE'><CustomDetailReportType>CustomTxnDetail</Custom
DetailReportType><ReportDateMacro>ThisYear</ReportDateMacro><Summariz
eRowsBy>Year</SummarizeRowsBy><IncludeColumn>Account</IncludeColum
n><IncludeColumn>Date</IncludeColumn><IncludeColumn>TxnType</IncludeC
olumn><IncludeColumn>Amount</IncludeColumn><IncludeColumn>Name</Incl
udeColumn><IncludeColumn>TxnNumber</IncludeColumn></CustomDetailRep
ortQueryRq></QBXMLMsgsRq></QBXML>"
report = qbXMLRP.ProcessRequest(ticket, trans)

'note that in QB custom transaction report the Num column is referred to as
<IncludeColumn>RefNumber</IncludeColumn>
'yet when i included that column in qbxml request the response appeared to omit
records where Num was blank
'close session and connection
qbXMLRP.EndSession ticket
boolSessionBegun = False
qbXMLRP.CloseConnection 'Create xmlDoc Obj
Dim xmlDoc As New DOMDocument40
Dim objNodeList As IXMLDOMNodeList 'Node objects
Dim objChild As IXMLDOMNode
Dim val As IXMLDOMNode
Dim col As IXMLDOMNode
Dim ctr As Integer
```

```
'add header to Excel sheet
wksSheet.Cells(1, 1).Value = "Date"
wksSheet.Cells(1, 2).Value = "Description"
wksSheet.Cells(1, 3).Value = "Account Number"
wksSheet.Cells(1, 4).Value = "Name"
wksSheet.Cells(1, 5).Value = "Check Number"
wksSheet.Cells(1, 6).Value = "Amount"
Columns("B:B").Select
   Selection.NumberFormat = "m/d/yyyy"
   Columns("F:F").Select
   Selection.Style = "Comma"
   Selection.NumberFormat = "_(* #,##0.00_);_(* (#,##0.00);_(* ""-""??_);_(@_)"

'Get nodes list
ctr = 2
xmlDoc.LoadXML report
Set objNodeList = xmlDoc.getElementsByTagName("ColData")
For Each objChild In objNodeList
   Set col = objChild.Attributes.getNamedItem("colID")
   Set val = objChild.Attributes.getNamedItem("value")
   If val.Text = "TOTAL" Then
      Exit For
   End If
   Select Case col.Text
      Case 2
      wksSheet.Cells(ctr, 3).Value = val.Text
      Case 3
      wksSheet.Cells(ctr, 1).Value = val.Text
      Case 4
      wksSheet.Cells(ctr, 2).Value = val.Text
      Case 5
      wksSheet.Cells(ctr, 6).Value = val.Text
      Case 6
      wksSheet.Cells(ctr, 4).Value = val.Text
      Case 7
      wksSheet.Cells(ctr, 5).Value = val.Text
      ctr = ctr + 1
   End Select
Next Cells.Select
Cells.EntireColumn.AutoFit Exit Sub errHandler:
```

```
If Err.Number = &H80040420 Then
   MsgBox "Operation cancelled"
Else
   MsgBox "HRESULT = " & Err.Number & " (" & Hex(Err.Number) & ") " & vbCrLf
& vbCrLf & Err.Description
End If End Sub
```

Source Code 3 extracts transactions and lists from a desktop version of QuickBooks™ writes the transactions and lists in an Excel™ workbook or worksheet, using Datablox™.

For example, if a customer wants to stop using a desktop version of QuickBooks™, the customer can utilize Source Code 3, as set forth below, to transfer the data from the desktop version of QuickBooks™ to the new accounting software application.

The following example of source code (Source Code 3) is subject to copyright protection. The copyright owner has no objection to the facsimile reproduction by anyone of the patent document or patent disclosure, as it appears in the Patent and Trademark Office patent file or records, but otherwise reserves all copyright rights to this source code.

Source Code 3

```
Public Sub qbi_GetData( )
'CH 9/2/14
'program needs 'reference' to OfficeQ6 - but no include file
Dim qbs As officeq6.Reader
Dim nErr
Dim rs As Recordset
Dim a$
a = gini_SetRootDirs( )
    '--- qbs name is arbitrary, but makes code simple to edit
    '--- ole object - dim and create
    '--- OfficeQ6 is the Datablox product
Set qbs = CreateObject("OfficeQ6.Reader")
        '--- read the QB company data and create a QQT file
nErr = qbs.ReadFile("", "qqtfile=" & gsRootDirData & "QBdata.qqt")
'set the data source to be the qqt file
gnDataSource = gnRemoteQQT
'populate the mdb from the qqt file
nErr = qbi_ImportAllData(gsRootDirData & "QBdata.qqt",
gsRootDirData & "sprm_prod_2010.mdb", "", True)
nErr = qbs.Done( )
qbi_MDBtoExcel
Set qbs = Nothing   'Note that this line is VERY IMPORTANT
            'It is what causes the program to disconnect from
            'the OfficeQ6 module and remove OfficeQ6 from memory
End Sub
Public Sub qbi_MDBtoExcel( )
'added by CH
'data from mdb to excel
Dim daoDB      As DAO.Database
Dim daoQueryDef As DAO.QueryDef
Dim daoRcd     As DAO.Recordset
Dim lastrow As Long
Dim rowctr As Long
Set daoDB = OpenDatabase(gsRootDirData & "sprm_prod_2010.mdb")
'company
Set daoQueryDef = daoDB.QueryDefs("qCompany")
Set daoRcd = daoQueryDef.OpenRecordset
Sheets("Company").Cells.ClearContents
Sheets("Company").Range("A1").CopyFromRecordset daoRcd
'accounts with balances
Set daoQueryDef = daoDB.QueryDefs("qFiscalYTDTrialBalance")
Set daoRcd = daoQueryDef.OpenRecordset
Sheets("Accounts").Activate
Sheets("Accounts").Cells.ClearContents
Sheets("Accounts").Range("A2").CopyFromRecordset daoRcd
Sheets("Accounts").Range("A1").Value = "Account #"
Sheets("Accounts").Range("B1").Value = "Account Name"
Sheets("Accounts").Range("C1").Value = "Account Type"
Sheets("Accounts").Range("D1").Value = "Description"
Sheets("Accounts").Range("E1").Value = "Debit"
Sheets("Accounts").Range("F1").Value = "Credit"
Sheets("Accounts").Columns("E:G").Style = "Currency"
Sheets("Accounts").Cells.EntireColumn.AutoFit
'need to translate account types in QB to Kashoo. The TYPE value must
be CAPS and have an underscore to replace a space for Kashoo
    Sheets("Accounts").Columns("C:C").Replace What:="FixedAsset",
Replacement:="FIXED_ASSET"
    Sheets("Accounts").Columns("C:C").Replace What:="AcctRec",
Replacement:="ACCOUNTS_RECEIVABLE"
    Sheets("Accounts").Columns("C:C").Replace What:="AcctPay",
Replacement:="ACCOUNTS_PAYABLE"
    Sheets("Accounts").Columns("C:C").Replace What:="OthCurrLiab",
Replacement:="OTHER_CURRENT_LIABILITY"
    Sheets("Accounts").Columns("C:C").Replace What:="OthCurrAsset",
Replacement:="OTHER_CURRENT_ASSET"
    Sheets("Accounts").Columns("C:C").Replace What:="COGS",
Replacement:="COST_OF_GOODS_SOLD"
    Sheets("Accounts").Columns("C:C").Replace What:="CredCard",
Replacement:="CREDIT_CARD"
    Sheets("Accounts").Columns("C:C").Replace What:="LongTermLiab",
Replacement:="LONG_TERM_LIABILITY"
    Sheets("Accounts").Columns("C:C").Replace What:="OthAsset",
Replacement:="OTHER_ASSET"
    Sheets("Accounts").Columns("C:C").Replace What:="OthIncome",
Replacement:="INCOME"
    Sheets("Accounts").Columns("C:C").Replace What:="OthExpense",
Replacement:="EXPENSE"
    Sheets("Accounts").Columns("C:C").Replace What:="Loan",
Replacement:="LONG_TERM_LIABILITY"
    Sheets("Accounts").Columns("C:C").Replace What:="Bank",
Replacement:="BANK"
    Sheets("Accounts").Columns("C:C").Replace What:="Expense",
Replacement:="EXPENSE"
    Sheets("Accounts").Columns("C:C").Replace What:="Equity",
Replacement:="EQUITY"
    Sheets("Accounts").Columns("C:C").Replace What:="Income",
Replacement:="INCOME"
'find Retained Earnings and change its type. Can't change its type to RE
cause Kashoo already has 1 account type RE
'and does not permit a 2nd account with type RE
'lastrow = Sheets("Accounts").Range("A" &
Rows.Count).End(xlUp).Row
'For rowctr = 2 To lastrow
'    If Sheets("Accounts").Cells(rowctr, 2).Value = "Retained Earnings"
Then
'        Sheets("Accounts").Cells(rowctr, 3).Value =
"RETAINED_EARNINGS"
'    End If
'Next
'customers
Sheets("Customers").Cells.ClearContents
Set daoQueryDef = daoDB.QueryDefs("qCustomers")
Set daoRcd = daoQueryDef.OpenRecordset
Sheets("Customers").Range("A2").CopyFromRecordset daoRcd
Sheets("Customers").Range("A1").Value = "Company Name"
Sheets("Customers").Range("B1").Value = "Email"
Sheets("Customers").Range("C1").Value = "First Name"
Sheets("Customers").Range("D1").Value = "Last Name"
Sheets("Customers").Range("E1").Value = "Street Address"
Sheets("Customers").Range("F1").Value = "Street Address 2"
Sheets("Customers").Range("G1").Value = "City"
Sheets("Customers").Range("H1").Value = "State/Province"
Sheets("Customers").Range("I1").Value = "Country"
Sheets("Customers").Range("J1").Value = "Zip/Postal Code"
Sheets("Customers").Range("K1").Value = "Phone"
Sheets("Customers").Range("L1").Value = "Fax"
Sheets("Customers").Range("M1").Value = "Mobile"
Sheets("Customers").Range("N1").Value = "Toll-free"
Sheets("Customers").Range("O1").Value = "Ship To Name"
Sheets("Customers").Range("P1").Value = "Ship To Street"
Sheets("Customers").Range("Q1").Value = "Ship to Street2"
Sheets("Customers").Range("R1").Value = "Ship to city"
Sheets("Customers").Range("S1").Value = "Ship to state or province"
Sheets("Customers").Range("T1").Value = "Ship to country"
Sheets("Customers").Range("U1").Value = "Ship to notes"
Sheets("Customers").Cells.EntireColumn.AutoFit
'vendors
Sheets("Vendors").Cells.ClearContents
Set daoQueryDef = daoDB.QueryDefs("qVendors")
Set daoRcd = daoQueryDef.OpenRecordset
Sheets("Vendors").Range("A2").CopyFromRecordset daoRcd
Sheets("Vendors").Range("A1").Value = "Company Name"
Sheets("Vendors").Range("B1").Value = "Email"
Sheets("Vendors").Range("C1").Value = "First Name"
Sheets("Vendors").Range("D1").Value = "Last Name"
```

Source Code 3 (continued)

```
Sheets("Vendors").Range("E1").Value = "Street Address"
Sheets("Vendors").Range("F1").Value = "Street Address 2"
Sheets("Vendors").Range("G1").Value = "City"
Sheets("Vendors").Range("H1").Value = "State/Province"
Sheets("Vendors").Range("I1").Value = "Country"
Sheets("Vendors").Range("J1").Value = "Zip/Postal Code"
Sheets("Vendors").Range("K1").Value = "Phone"
Sheets("Vendors").Range("L1").Value = "Fax"
Sheets("Vendors").Range("M1").Value = "Mobile"
Sheets("Vendors").Range("N1").Value = "Toll-free"
Sheets("Vendors").Cells.EntireColumn.AutoFit
'transactions
Sheets("Transactions").Cells.ClearContents
Set daoQueryDef = daoDB.QueryDefs("qTrans")
Set daoRcd = daoQueryDef.OpenRecordset
Sheets("Transactions").Range("A1").CopyFromRecordset daoRcd
Sheets("Transactions").Columns("F:F").Style = "Currency"
Sheets("Transactions").Cells.EntireColumn.AutoFit
Sheets("Accounts").Range("A1").Select
End Sub
Public Sub callback(control As IRibbonControl)
    Select Case control.Tag
    Case "fromQB": qbi_GetData
    Case "toPAO": getaccountids
    End Select
End Sub
```

Source Code 4 transfers transactions and lists in Excel™ to the new accounting application software using the application program interface of the new accounting application software.

For example, if a customer wants to stop using a desktop version of QuickBooks™, the customer can utilize Source Code 4, as set forth below, to transfer the data from Excel™ to the new accounting software application.

The following example of source code (Source Code 4) is subject to copyright protection. The copyright owner has no objection to the facsimile reproduction by anyone of the patent document or patent disclosure, as it appears in the Patent and Trademark Office patent file or records, but otherwise reserves all copyright rights to this source code.

Source Code 4

```
Public Sub connKashoo( )
'adds an account from the active sheet to Kashoo. Duplicate account
names are not added and return an error.
'also duplicate account numbers are not added
'successfully adds accounts to PAO 9/15/14
Dim strToken As String
Dim busID As String
Dim XMLHttp As New MSXML2.XMLHttp
Dim strData As String
Dim aNumber As String
Dim aName As String
Dim aType As String
Dim aDesc As String
Dim xmlAcct As String
Dim xmlAddAcct As String
Dim dt As String
Dim c As String
Dim lastrow As Long
Dim rowctr As Long
Dim wksSheet As Excel.Worksheet
Dim sheetname As String
Application.Cursor = xlWait
sheetname = "Accounts"
Set wksSheet = Application.ActiveSheet
lastrow = Range("A" & Rows.Count).End(xlUp).Row
Select Case sheetname
Case "Accounts"
dt = Chr(34) & Format(Date, "yyyy-mm-dd") & Chr(34)
```

Source Code 4 (continued)

```
For rowctr = 2 To lastrow
    aNumber = Chr(34) & wksSheet.Cells(rowctr, 1).Value & Chr(34)
    aName = Chr(34) & wksSheet.Cells(rowctr, 2).Value & Chr(34)
    aType = Chr(34) & wksSheet.Cells(rowctr, 3).Value & Chr(34)
    aDesc = Chr(34) & wksSheet.Cells(rowctr, 4).Value & Chr(34)
    xmlAcct = "<account description = " & aDesc & " name = " & aName & " "
    number = " & aNumber & " openDate = " & dt & " type = " & aType & "/>"
    xmlAddAcct = "<?xml version=""1.0"" encoding=""UTF-8""
standalone=""yes""?>" & xmlAcct
    XMLHttp.Open "POST",
"https://api.paychexaccounting.com/api/businesses/23468118456/accounts",
False
    XMLHttp.send xmlAddAcct
    strData = strData & XMLHttp.responseText
    xmlAcct = ""
    xmlAddAcct = ""
Next rowctr
Case "Customers"
Case "Vendors"
Case "fiscalyeartotdatetrialbalance"
End Select
'successsfully gets a token by prompting user for credentials
' XMLHttp.Open "POST", "https://api.kashoo.com/api/authTokens",
False, "", ""
' XMLHttp.send
' strToken = XMLHttp.responseText
'get business ids connected to user. will fail if one or more businesses are
expired
XMLHttp.Open "GET",
"https://api.paychexaccounting.com/api/users/me/businesses", False
XMLHttp.setRequestHeader "Authorization",
"AuthSub token=" & strToken
XMLHttp.send
busID = XMLHttp.responseText
'successful 9.15.14
'Dim strData As String
'XMLHttp.Open "GET",
"https://api.paychexaccounting.com/api/users/me", False
'XMLHttp.setRequestHeader "Authorization",
"AuthSub token=" & strToken
'XMLHttp.send
'strData = XMLHttp.responseText
Application.Cursor = xlDefault
End Sub
Public Sub postje(id As Double)
'purpose is to post journal entries to PAO. I was unable to determine
the correct XML form to place multiple
'journal entries into one XML document. As a result I post and send
each journal entry. This may be OK since I get a
'response for each journal entry as to its success or failure.
Dim strResp As String
Dim XMLHttp As New MSXML2.XMLHttp
Dim wksSheet As Excel.Worksheet
Dim rowctr As Long
Dim lastrow As Long
Dim trnDate As String
Dim trnNum As Long
Dim trnType As String
Dim trnAmt As String
Dim trnAmount As Long
Dim trnAccount As String
Dim xmlJE As String
Set wksSheet = Application.ActiveSheet
lastrow = Range("A" & Rows.Count).End(xlUp).Row
'loop thru all rows in active sheet
For rowctr = 1 To lastrow
    xmlJE = "<?xml version=""1.0"" encoding=
""UTF-8"" standalone=""yes""?>"
    'set values for header of journal entry
    trnNum = wksSheet.Cells(rowctr, 1).Value
    trnDate = Chr(34) & Format(wksSheet.Cells(rowctr, 2).Value,
"yyyy-mm-dd") & Chr(34)
    trnType = Chr(34) & wksSheet.Cells(rowctr, 3).Value & Chr(34)
    xmlJE = xmlJE & "<manualAdjustmentRecord memo=
""QuickBooks import""
```

-continued

Source Code 4

```
currency=""USD"" date= " & trnDate & " number = " & trnType &
"><adjustments>"
    'loop thru each row having same transaction ID. These rows create
the
journal entry.
    Do While trnNum = wksSheet.Cells(rowctr, 1).Value
        trnAccount = Chr(34) & wksSheet.Cells(rowctr, 7).Value & Chr
(34)
        trnAmount = Str$(-100 * wksSheet.Cells(rowctr, 6).Value)
        trnAmt = Chr(34) & trnAmount & Chr(34)
        xmlJE = xmlJE & "<adjustment account=
" & trnAccount & " amount= " & trnAmt & " currency=""USD""/>"
        rowctr = rowctr + 1
    Loop
    xmlJE = xmlJE & "</adjustments></manualAdjustmentRecord>"
    rowctr = rowctr - 1
    XMLHttp.Open "POST",
"https://api.paychexaccounting.com/api/businesses/" & id &
"/records/adjustments", False
    XMLHttp.send xmlJE
    strResp = strResp & XMLHttp.responseText
    xmlJE = ""
Next rowctr
End Sub
```

In summary, a method and system automatically convert formatted data from one software application source into a format compatible for importing into another software application, using a third software application by launching, through a user's interaction with a user interface associated with the computer, a spreadsheet application; launching, through a user's interaction with a user interface associated with the computer, a first accounting software application; initiating, through a user's interaction with the user interface associated with the computer, a first extension of the launched spreadsheet application; electronically connecting the initiated first extension with the launched first accounting software application, through an application program interface of the launched first accounting software application, to create a first electronic data channel between the initiated first extension and the launched first accounting software application; electronically pulling, by the initiated first extension, accounting data from the launched first accounting software application through the first electronic data channel to the initiated first extension; electronically converting, by the initiated first extension, the pulled data into a format compatible with a second accounting software application; electronically writing, by the initiated first extension, the converted data into a workbook created by the launched spreadsheet application; launching, through a user's interaction with the user interface associated with the computer, a second accounting software application; initiating, through a user's interaction with the user interface associated with the computer, a second extension of the launched spreadsheet application; electronically connecting the initiated second extension with the launched second accounting software application, through an application program interface of the launched second accounting software application to create a second electronic data channel between the initiated second extension and the launched second accounting software application; electronically converting, by the initiated second extension, the converted data in the workbook to a format compatible for importing into the launched second accounting software application; and electronically pushing the format compatible data into the launched second accounting software application.

The electronic conversion by the initiated second extension may convert the converted data in the workbook to a XML format. The electronic conversion by the initiated first extension may convert the pulled data by using pre-determined tables which map data fields of the launched first accounting software application to data fields of the launched second accounting software application. The converted data in the workbook may be edited by a user before the second extension of the launched spreadsheet application is initiated through a user's interaction with the user interface associated with the computer.

The launched spreadsheet application may reside on the computer and the accounting data from the launched first accounting software application may reside on the computer.

The launched spreadsheet application may reside on the computer and the accounting data from the launched first accounting software application may reside on a second computer communicatively connected to the computer through a local area network.

The launched spreadsheet application may reside on the computer and the accounting data from the launched first accounting software application may reside on a second computer communicatively connected to the computer through a wide area network.

The launched spreadsheet application may reside on the computer and the accounting data for the launched second accounting software application may reside on the computer.

The launched spreadsheet application may reside on the computer and the accounting data for the launched second accounting software application may reside on a second computer communicatively connected to the computer through a local area network.

The launched spreadsheet application may reside on the computer and the accounting data for the launched second accounting software application may reside on a second computer communicatively connected to the computer through a wide area network.

It is noted that the various embodiments may be carried out by a processor executing software corresponding to the source code described herein or the various embodiments may be carried out by firmware executing processes corresponding to the source code described herein.

It is further noted that processes described herein may be carried out in a single computer, over a local area network, or over a wide area network (internet or cloud).

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above.

What is claimed is:

1. A method, using a computer, for automatically converting formatted data from one software application source into a format compatible for importing into another software application, using a third software application, comprising the steps of:
    (a) launching, through a first user-initiated interaction with a user interface associated with the computer, a spreadsheet application;
    (b) launching, through a second user-initiated interaction with the user interface associated with the computer, a first accounting software application;

(c) initiating, through a third user-initiated interaction with the user interface associated with the computer, a first extension of the launched spreadsheet application;
(d) electronically connecting the initiated first extension with the launched first accounting software application, through an application program interface of the launched first accounting software application, to create a first electronic data channel between the initiated first extension and the launched first accounting software application;
(e) electronically pulling, by the initiated first extension, accounting data from the launched first accounting software application through the first electronic data channel to the initiated first extension;
(f) electronically translating, by the initiated first extension, the pulled data into new data which is compatible with a second accounting software application;
(g) electronically writing, by the initiated first extension, the new data into a workbook created by the launched spreadsheet application;
(h) launching, through a fourth user-initiated interaction with the user interface associated with the computer, a second accounting software application;
(i) initiating, through a fifth user-initiated interaction with the user interface associated with the computer, a second extension of the launched spreadsheet application;
(j) electronically connecting the initiated second extension with the launched second accounting software application, through an application program interface of the launched second accounting software application to create a second electronic data channel between the initiated second extension and the launched second accounting software application;
(k) electronically formatting, by the initiated second extension, the new data in the workbook to an import format compatible for importing into the launched second accounting software application; and
(l) electronically pushing the import format compatible new data into the launched second accounting software application.

2. The method as claimed in claim 1, wherein the electronic conversion by the initiated second extension formats the new data in the workbook to a XML format.

3. The method as claimed in claim 1, wherein the electronic translation by the initiated first extension translates the pulled data by using pre-determined tables which map data fields of the launched first accounting software application to data fields of the launched second accounting software application.

4. The method as claimed in claim 1, wherein the new data in the workbook is edited by a user before the second extension of the launched spreadsheet application is initiated through the fifth user-initiated interaction with the user interface associated with the computer.

5. The method as claimed in claim 1, wherein the launched spreadsheet application resides on the computer and the accounting data from the launched first accounting software application resides on the computer.

6. The method as claimed in claim 1, wherein the launched spreadsheet application resides on the computer and the accounting data from the launched first accounting software application resides on a second computer communicatively connected to the computer through a local area network.

7. The method as claimed in claim 1, wherein the launched spreadsheet application resides on the computer and the accounting data from the launched first accounting software application resides on a second computer communicatively connected to the computer through a wide area network.

8. The method as claimed in claim 1, wherein the launched spreadsheet application resides on the computer and the accounting data for the launched second accounting software application will reside on the computer.

9. The method as claimed in claim 1, wherein the launched spreadsheet application resides on the computer and the accounting data for the launched second accounting software application will reside on a second computer communicatively connected to the computer through a local area network.

10. The method as claimed in claim 1, wherein the launched spreadsheet application resides on the computer and the accounting data for the launched second accounting software application will reside on a second computer communicatively connected to the computer through a wide area network.

11. A system for automatically converting formatted data from one software application source into a format compatible for importing into another software application, using a third software application, comprising:
    a computer including a processor, memory, and a user interface;
    said processor launching, through a first user-initiated interaction with said user interface, a spreadsheet application;
    said processor launching, through a second user-initiated interaction with said user interface, a first accounting software application;
    said processor initiating, through a third user-initiated interaction with said user interface, a first extension of the launched spreadsheet application;
    said processor electronically connecting the initiated first extension with the launched first accounting software application, through an application program interface of the launched first accounting software application, to create a first electronic data channel between the initiated first extension and the launched first accounting software application;
    said processor electronically pulling, by the initiated first extension, accounting data from the launched first accounting software application through the first electronic data channel to the initiated first extension;
    said processor electronically translating, by the initiated first extension, the pulled data into new data which is compatible with a second accounting software application;
    said processor electronically writing, by the initiated first extension, the new data into a workbook created by the launched spreadsheet application;
    said processor launching, through a fourth user-initiated interaction with said user interface, a second accounting software application;
    said processor initiating, through a fifth user-initiated interaction with said user interface, a second extension of the launched spreadsheet application;
    said processor electronically connecting the initiated second extension with the launched second accounting software application, through an application program interface of the launched second accounting software application to create a second electronic data channel between the initiated second extension and the launched second accounting software application;

said processor electronically formatting, by the initiated second extension, the new data in the workbook to an import format compatible for importing into the launched second accounting software application; and said processor pushing the import format compatible new data into the launched second accounting software application.

12. The system as claimed in claim 11, wherein the electronic conversion by the initiated second extension formats the new data in the workbook to a XML format.

13. The system as claimed in claim 11, wherein the electronic translation by the initiated first extension translates the pulled data by using pre-determined tables which map data fields of the launched first accounting software application to data fields of the launched second accounting software application.

14. The system as claimed in claim 11, wherein the new data in the workbook is edited by a user before the second extension of the launched spreadsheet application is initiated through the fifth user-initiated interaction with the user interface associated with the computer.

15. The system as claimed in claim 11, wherein the launched spreadsheet application resides on said computer and the accounting data from the launched first accounting software application resides on said computer.

16. The system as claimed in claim 11, wherein the launched spreadsheet application resides on said computer and the accounting data from the launched first accounting software application resides on a second computer communicatively connected to said computer through a local area network.

17. The system as claimed in claim 11, wherein the launched spreadsheet application resides on said computer and the accounting data from the launched first accounting software application resides on a second computer communicatively connected to said computer through a wide area network.

18. The system as claimed in claim 11, wherein the launched spreadsheet application resides on said computer and the accounting data for the launched second accounting software application will reside on said computer.

19. The system as claimed in claim 11, wherein the launched spreadsheet application resides on said computer and the accounting data for the launched second accounting software application will reside on a second computer communicatively connected to said computer through a local area network.

20. The system as claimed in claim 11, wherein the launched spreadsheet application resides on said computer and the accounting data for the launched second accounting software application will reside on a second computer communicatively connected to said computer through a wide area network.

* * * * *